United States Patent
Zhang et al.

(10) Patent No.: US 11,777,675 B2
(45) Date of Patent: Oct. 3, 2023

(54) METHOD FOR TRANSMITTING SOUNDING REFERENCE SIGNAL FOR USER EQUIPMENT WITH ASYMMETRIC TRANSMIT/RECEIVE

(71) Applicant: Qualcomm Incorporated, San Diego, CA (US)

(72) Inventors: Yu Zhang, Beiijing (CN); Wanshi Chen, San Diego, CA (US); Chao Wei, Beijing (CN); Peter Gaal, San Diego, CA (US); Timo Ville Vintola, San Diego, CA (US); Vishal Mahajan, Dublin, CA (US); Alexei Yurievitch Gorokhov, San Diego, CA (US); Amir Aminzadeh Gohari, Sunnyvale, CA (US); Alexandros Manolakos, San Diego, CA (US); Joseph Binamira Soriaga, San Diego, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 16/641,639

(22) PCT Filed: Sep. 7, 2017

(86) PCT No.: PCT/CN2017/100921
§ 371 (c)(1),
(2) Date: Feb. 24, 2020

(87) PCT Pub. No.: WO2019/037158
PCT Pub. Date: Feb. 28, 2019

(65) Prior Publication Data
US 2021/0367724 A1 Nov. 25, 2021

(30) Foreign Application Priority Data
Aug. 24, 2017 (WO) ................ PCT/CN2017/098815

(51) Int. Cl.
*H04L 5/00* (2006.01)
*H04B 7/0413* (2017.01)

(52) U.S. Cl.
CPC ......... *H04L 5/0048* (2013.01); *H04B 7/0413* (2013.01); *H04L 5/001* (2013.01)

(58) Field of Classification Search
USPC ....................................................... 370/329
See application file for complete search history.

(56) References Cited

U.S. PATENT DOCUMENTS 10,511,364 B2 * 12/2019 Kim ..................... H04B 7/0404
10,797,850 B2 * 10/2020 Haine .................. H04B 7/0404
(Continued)

FOREIGN PATENT DOCUMENTS

CN 101969337 A 2/2011
CN 102160446 A 8/2011
(Continued)

OTHER PUBLICATIONS

3GPP TS 36.211 V13.6.0 (Jun. 2017) (Year: 2017).*
(Continued)

*Primary Examiner* — Jeffrey M Rutkowski
*Assistant Examiner* — Luna Weissberger
(74) *Attorney, Agent, or Firm* — Holland & Hart LLP

(57) ABSTRACT

Methods, systems, and devices for wireless communications are described. A user equipment (UE) may transmit a UE capability message, the UE capability message indicating a supported transmit antenna switching (TxAS) capability for each port of the UE. The UE may receive a configuration message indicating an uplink multiple-input/multiple-output (UL MIMO) configuration for the UE, the UL MIMO configuration being based at least in part on the UE capability message. The UE may identify, based at least in part on the configuration message, a sounding reference signal
(Continued)

(SRS) configuration to use for transmitting SRSs in conjunction with the UL MIMO communications, the SRS configuration comprising a configuration for transmission by the UE of SRSs using at least one of the two or more ports of the UE, the SRSs transmitted on one or more antennas of the UE selected according to a TxAS configuration for the respective port.

34 Claims, 21 Drawing Sheets

(56) References Cited

U.S. PATENT DOCUMENTS

| | | | |
|---|---|---|---|
| 2010/0215114 | A1 | 8/2010 | Kim et al. |
| 2012/0213154 | A1* | 8/2012 | Gaal ............... H04B 7/0608 |
| | | | 370/328 |
| 2013/0149975 | A1 | 6/2013 | Yu et al. |
| 2014/0233665 | A1* | 8/2014 | Clevorn ............ H04B 7/061 |
| | | | 375/267 |
| 2014/0301297 | A1 | 10/2014 | Geirhofer et al. |
| 2016/0165575 | A1* | 6/2016 | Park ................. H04B 7/0608 |
| | | | 370/329 |
| 2019/0109683 | A1* | 4/2019 | Kimura ............. H04L 1/0025 |
| 2021/0083825 | A1* | 3/2021 | Choi ................. H04L 1/06 |

FOREIGN PATENT DOCUMENTS

| | | | |
|---|---|---|---|
| CN | 102804630 | A | 11/2012 |
| CN | 103166690 | A | 6/2013 |
| CN | 103905104 | A | 7/2014 |
| CN | 105122668 | A | 12/2015 |
| CN | 106165310 | A | 11/2016 |

OTHER PUBLICATIONS

Supplementary European Search Report—EP17922831—Search Authority—Munich—dated Jul. 12, 2021 (175978EP).
Supplementary Partial European Search Report—EP17922831—Search Authority—Munich—dated Apr. 9, 2021 (175978EP).
International Search Report and Written Opinion—PCT/CN2017/098815—ISA/EPO—dated Mar. 1, 2018 (175978WO1).
International Search Report and Written Opinion—PCT/CN2017/100921—ISA/EPO—dated Apr. 28, 2018 (175978WO2).

* cited by examiner

METHOD FOR TRANSMITTING SOUNDING REFERENCE SIGNAL FOR USER EQUIPMENT WITH ASYMMETRIC TRANSMIT/RECEIVE

CROSS REFERENCES

The present application is a 371 national phase filing of International Application No. PCT/CN2017/100921 by Zhang et. al., entitled "METHOD FOR TRANSMITTING SOUNDING REFERENCE SIGNAL FOR USER EQUIPMENT WITH ASYMMETRIC TRANSMIT/RECEIVE", filed Sep. 7, 2017; which claims priority to International Patent Application No. PCT/CN2017/098815 to Zhang et. al., entitled "METHOD FOR TRANSMITTING SOUNDING REFERENCE SIGNAL FOR USER EQUIPMENT WITH ASYMMETRIC TRANSMIT/RECEIVE", filed Aug. 24, 2017, each of which is assigned hereof.

BACKGROUND

The following relates generally to wireless communication, and more specifically to method for transmitting sounding reference signal (SRS) for user equipment (UE) with asymmetric transmit/receive (TX/RX).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as UE.

Conventionally, a UE may be configured to support higher data rates in the downlink (e.g., using downlink multiple-input/multiple-output (DL MIMO) protocols) than in the uplink. For example, the UE may be configured with one transmit chain and two receive chains to support different data rates. The UE may also be configured with multiple antennas such that transmission of reference signals (such as sounding reference signals (SRSs)) may be switched between the available antennas. For example, the UE may transmit a SRS from a first antenna during a first SRS transmission opportunity and from a second antenna during a second SRS transmission opportunity. The UE may be configured with an antenna switching mechanism to route the output of the single transmitter to the different antennas.

For reciprocity based DL MIMO, transmission of the SRS transmissions using antenna switching mechanisms may be used to compensate for asymmetric transmit/receive paths. For example, the UE may have asymmetry within its transmit/receive chains, e.g., due to different components within each chain, the antenna switching mechanism, etc. Thus, the base station may perform uplink channel estimations using the SRS transmissions with transmit antenna switching from the UE to determine precoding information for the DL MIMO communications. While this solution may work for a 1TX/2RX chain configuration using the alternating antenna configuration for the SRS transmissions, the SRS antenna switching may become more complicated using advanced configurations (e.g., 1TX/4RX, 2TX/4RX, etc.).

SUMMARY

The described techniques relate to improved methods, systems, devices, or apparatuses that support method for transmitting SRS for UEs with asymmetric TX/RX. Generally, the described techniques provide for selection of sounding reference signal (SRS) configurations in scenarios such as when uplink multiple-input/multiple-output (UL MIMO) are and are not supported, carrier aggregation (CA) protocols are deployed, and/or for on-demand or as needed (e.g., aperiodic) SRS transmissions. In some aspects, the UE may transmit a UE capability report (e.g., message) to the base station indicating the number of ports of the UE and, for each port, a transmit antenna switching (TxAS) capability the UE supports. The base station may respond with a configuration message indicating the TxAS configuration for the UE to use (e.g., in a closed-loop scenario) or indicating an open-loop scenario where the UE selects the TxAS configuration to use for the SRS transmission. As one example where UL MIMO is not configured, a user equipment (UE) may be configured with open-loop or closed-loop SRS configurations where the UE identifies the antennas to use for the SRS transmissions, e.g., based on a configuration message received from a base station. As another example where UL MIMO is configured, the UE may identify the SRS configuration based on the UL MIMO communications being configured for two or more ports (e.g., transmitters/transmit chains). In another example where CA UL MIMO is configured, the UE may identify the SRS configuration based on a power amplifier transmitting one of the component carriers (CCs) configured for UL MIMO, e.g., regardless of whether other CCs transmitted by the power amplifier are configure for UL MIMO. In yet another example where aperiodic SRS transmissions are triggered, the UE may identify an antenna configuration for transmission of the SRSs based on the trigger message.

A method of wireless communication is described. The method may include transmitting a UE capability message to a base station, the UE capability message indicating a supported TxAS capability for each port of the UE, receiving a configuration message from the base station indicating an UL MIMO configuration for the UE, the UL MIMO configuration being based at least in part on the UE capability message and comprising the use of two or more ports of the UE for UL MIMO communications over two or more spatial layers, identifying, based at least in part on the configuration message, a SRS configuration to use for transmitting SRSs in conjunction with the UL MIMO communications, the SRS configuration comprising a configuration for transmission by the UE of SRSs using at least one of the two or more ports of the UE, the SRSs transmitted on one or more antennas of the UE selected according to a TxAS configuration for the respective port, and transmitting the SRSs in conjunction with the UL MIMO communications and according to the SRS configuration.

An apparatus for wireless communication is described. The apparatus may include means for transmitting a UE capability message to a base station, the UE capability message indicating a supported TxAS capability for each port of the UE, means for receiving a configuration message from the base station indicating an UL MIMO configuration for the UE, the UL MIMO configuration being based at least in part on the UE capability message and comprising the use of two or more ports of the UE for UL MIMO communications over two or more spatial layers, means for identifying, based at least in part on the configuration message, a SRS configuration to use for transmitting SRSs in conjunction with the UL MIMO communications, the SRS configuration comprising a configuration for transmission by the UE of SRSs using at least one of the two or more ports of the UE, the SRSs transmitted on one or more antennas of the UE selected according to a TxAS configuration for the respective port, and means for transmitting the SRSs in conjunction with the UL MIMO communications and according to the SRS configuration.

Another apparatus for wireless communication is described. The apparatus may include a processor, memory in electronic communication with the processor, and instructions stored in the memory. The instructions may be operable to cause the processor to transmit a UE capability message to a base station, the UE capability message indicating a supported TxAS capability for each port of the UE, receive a configuration message from the base station indicating an UL MIMO configuration for the UE, the UL MIMO configuration being based at least in part on the UE capability message and comprising the use of two or more ports of the UE for UL MIMO communications over two or more spatial layers, identify, based at least in part on the configuration message, a SRS configuration to use for transmitting SRSs in conjunction with the UL MIMO communications, the SRS configuration comprising a configuration for transmission by the UE of SRSs using at least one of the two or more ports of the UE, the SRSs transmitted on one or more antennas of the UE selected according to a TxAS configuration for the respective port, and transmit the SRSs in conjunction with the UL MIMO communications and according to the SRS configuration.

A non-transitory computer readable medium for wireless communication is described. The non-transitory computer-readable medium may include instructions operable to cause a processor to transmit a UE capability message to a base station, the UE capability message indicating a supported TxAS capability for each port of the UE, receive a configuration message from the base station indicating an UL MIMO configuration for the UE, the UL MIMO configuration being based at least in part on the UE capability message and comprising the use of two or more ports of the UE for UL MIMO communications over two or more spatial layers, identify, based at least in part on the configuration message, a SRS configuration to use for transmitting SRSs in conjunction with the UL MIMO communications, the SRS configuration comprising a configuration for transmission by the UE of SRSs using at least one of the two or more ports of the UE, the SRSs transmitted on one or more antennas of the UE selected according to a TxAS configuration for the respective port, and transmit the SRSs in conjunction with the UL MIMO communications and according to the SRS configuration.

Some examples of the method, apparatus, and non-transitory computer-readable medium described above may further include processes, features, means, or instructions for determining that the configuration message indicates that the UE may be to use an open-loop TxAS configuration, wherein the UE autonomously selects the TxAS configuration to use for each port when transmitting the SRSs.

Some examples of the method, apparatus, and non-transitory computer-readable medium described above may further include processes, features, means, or instructions for determining that the configuration message indicates that the UE may be to use a closed-loop TxAS configuration, wherein the configuration message indicates the TxAS configuration to use for each port when transmitting the SRSs.

In some examples of the method, apparatus, and non-transitory computer-readable medium described above, the configuration message indicates a separate TxAS configuration for each port of the UE.

Some examples of the method, apparatus, and non-transitory computer-readable medium described above may further include processes, features, means, or instructions for identifying a number of spatial layers in the two or more spatial layers associated with the UL MIMO communications. Some examples of the method, apparatus, and non-transitory computer-readable medium described above may further include processes, features, means, or instructions for selecting the SRS configuration based at least in part on the number of spatial layers.

In some examples of the method, apparatus, and non-transitory computer-readable medium described above, the SRS configuration comprises transmitting SRSs using the same number of antennas as the number of spatial layers.

In some examples of the method, apparatus, and non-transitory computer-readable medium described above, the SRS configuration comprises transmitting SRSs using a fewer number of antennas than the number of spatial layers.

Some examples of the method, apparatus, and non-transitory computer-readable medium described above may further include processes, features, means, or instructions for determining that the UE may have a different number of transmit paths than receive paths, wherein the SRS configuration may be selected based at least in part on the determining.

A method of wireless communication is described. The method may include transmitting a UE capability message to a base station, the UE capability message indicating a supported TxAS capability for each port of the UE, receiving a configuration message from the base station indicating an UL MIMO configuration for the UE, the UL MIMO configuration being based at least in part on the UE capability message and comprising the use of two or more ports of the UE for UL MIMO communications over two or more spatial layers, determining that at least one component carrier (CC) of two or more CCs being transmitted using a first power amplifier is configured for the UL MIMO communications in accordance with the UL MIMO configuration, identifying, based at least in part on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, and transmitting the SRSs in conjunction with the UL MIMO communications and according to the SRS configuration.

An apparatus for wireless communication is described. The apparatus may include means for transmitting a UE capability message to a base station, the UE capability message indicating a supported TxAS capability for each port of the UE, means for receiving a configuration message from the base station indicating an UL MIMO configuration for the UE, the UL MIMO configuration being based at least in part on the UE capability message and comprising the use of two or more ports of the UE for UL MIMO communications over two or more spatial layers, means for determining that at least one CC of two or more CCs being transmitted using a first power amplifier is configured for the UL MIMO communications in accordance with the UL MIMO configuration, means for identifying, based at least in part on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, and means for transmitting the SRSs in conjunction with the UL MIMO communications and according to the SRS configuration.

Another apparatus for wireless communication is described. The apparatus may include a processor, memory in electronic communication with the processor, and instructions stored in the memory. The instructions may be operable to cause the processor to transmit a UE capability message to a base station, the UE capability message indicating a supported TxAS capability for each port of the UE, receive a configuration message from the base station indicating an UL MIMO configuration for the UE, the UL MIMO configuration being based at least in part on the UE capability message and comprising the use of two or more ports of the UE for UL MIMO communications over two or more spatial layers, determine that at least one CC of two or more CCs being transmitted using a first power amplifier is configured for the UL MIMO communications in accordance with the UL MIMO configuration, identify, based at least in part on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, and transmit the SRSs in conjunction with the UL MIMO communications and according to the SRS configuration.

A non-transitory computer readable medium for wireless communication is described. The non-transitory computer-readable medium may include instructions operable to cause a processor to transmit a UE capability message to a base station, the UE capability message indicating a supported TxAS capability for each port of the UE, receive a configuration message from the base station indicating an UL MIMO configuration for the UE, the UL MIMO configuration being based at least in part on the UE capability message and comprising the use of two or more ports of the UE for UL MIMO communications over two or more spatial layers, determine that at least one CC of two or more CCs being transmitted using a first power amplifier is configured for the UL MIMO communications in accordance with the UL MIMO configuration, identify, based at least in part on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, and transmit the SRSs in conjunction with the UL MIMO communications and according to the SRS configuration.

Some examples of the method, apparatus, and non-transitory computer-readable medium described above may further include processes, features, means, or instructions for transmitting the same SRSs on the at least one CC and on one or more additional CCs using the same SRS configuration, wherein the one or more additional CCs may be not configured for UL MIMO communications.

Some examples of the method, apparatus, and non-transitory computer-readable medium described above may further include processes, features, means, or instructions for transmitting the at least one CC using the first power amplifier and according to a first SRS configuration. Some examples of the method, apparatus, and non-transitory computer-readable medium described above may further include processes, features, means, or instructions for transmitting one or more additional CCs using a second power amplifier and according to a second SRS configuration, wherein the first power amplifier may be different from the second power amplifier.

In some examples of the method, apparatus, and non-transitory computer-readable medium described above, the at least one CC may be transmitted in a first band and the one or more additional CCs may be transmitted in a second band that may be different from the first band.

In some examples of the method, apparatus, and non-transitory computer-readable medium described above, the first SRS configuration may be the same as the second SRS configuration.

In some examples of the method, apparatus, and non-transitory computer-readable medium described above, the first SRS configuration may be different from the second SRS configuration.

Some examples of the method, apparatus, and non-transitory computer-readable medium described above may further include processes, features, means, or instructions for determining that the UE may have a different number of transmit paths than receive paths, wherein the SRS configuration may be selected based at least in part on the determining.

A method of wireless communication is described. The method may include transmitting a UE capability message to a base station, the UE capability message indicating a supported TxAS capability for each port of the UE, receiving a trigger message from a base station indicating that the UE is to perform an aperiodic SRS transmission, identifying, based at least in part on the trigger message, a TxAS configuration for the UE to use to transmit the aperiodic SRS transmission, and transmitting the SRS transmission using one or more antennas selected based at least in part on the TxAS configuration.

An apparatus for wireless communication is described. The apparatus may include means for transmitting a UE capability message to a base station, the UE capability message indicating a supported TxAS capability for each port of the UE, means for receiving a trigger message from a base station indicating that the UE is to perform an aperiodic SRS transmission, means for identifying, based at least in part on the trigger message, a TxAS configuration for the UE to use to transmit the aperiodic SRS transmission, and means for transmitting the SRS transmission using one or more antennas selected based at least in part on the TxAS configuration.

Another apparatus for wireless communication is described. The apparatus may include a processor, memory in electronic communication with the processor, and instructions stored in the memory. The instructions may be operable to cause the processor to transmit a UE capability message to a base station, the UE capability message indicating a supported TxAS capability for each port of the UE, receive a trigger message from a base station indicating that the UE is to perform an aperiodic SRS transmission, identify, based at least in part on the trigger message, a TxAS configuration for the UE to use to transmit the aperiodic SRS transmission, and transmit the SRS transmission using one or more antennas selected based at least in part on the TxAS configuration.

A non-transitory computer readable medium for wireless communication is described. The non-transitory computer-readable medium may include instructions operable to cause a processor to transmit a UE capability message to a base station, the UE capability message indicating a supported TxAS capability for each port of the UE, receive a trigger message from a base station indicating that the UE is to perform an aperiodic SRS transmission, identify, based at least in part on the trigger message, a TxAS configuration for the UE to use to transmit the aperiodic SRS transmission, and transmit the SRS transmission using one or more antennas selected based at least in part on the TxAS configuration.

Some examples of the method, apparatus, and non-transitory computer-readable medium described above may further include processes, features, means, or instructions for decoding one or more bits in the trigger message to identify the TxAS configuration.

Some examples of the method, apparatus, and non-transitory computer-readable medium described above may further include processes, features, means, or instructions for applying a reverse masking procedure to a field in the trigger message to identify the TxAS configuration.

In some examples of the method, apparatus, and non-transitory computer-readable medium described above, the field comprises a cyclic redundancy check (CRC) field of a physical downlink control channel (PDCCH) signal.

Some examples of the method, apparatus, and non-transitory computer-readable medium described above may further include processes, features, means, or instructions for decoding one or more bits in the trigger message to identify a flag associated with a plurality of possible TxAS configurations, wherein the TxAS configuration may be selected based at least in part on the flag.

Some examples of the method, apparatus, and non-transitory computer-readable medium described above may further include processes, features, means, or instructions for receiving an indication of the possible TxAS configurations from the base station during a channel connection or reconfiguration procedure.

In some examples of the method, apparatus, and non-transitory computer-readable medium described above, the indication of the possible TxAS configurations may be received via radio resource control (RRC) signaling.

In some examples of the method, apparatus, and non-transitory computer-readable medium described above, the indication of the possible TxAS configurations may be received in response to the UE capability message transmitted by the UE.

In some examples of the method, apparatus, and non-transitory computer-readable medium described above, the indication of the possible TxAS configurations may be received in media access control (MAC) control element (CE).

Some examples of the method, apparatus, and non-transitory computer-readable medium described above may further include processes, features, means, or instructions for selecting an TxAS configuration that comprises an SRS transmission using fewer ports than antennas.

Some examples of the method, apparatus, and non-transitory computer-readable medium described above may further include processes, features, means, or instructions for selecting an TxAS configuration that comprises an SRS transmission where different port and antenna pairs may be transmitted during different SRS transmission instances.

Some examples of the method, apparatus, and non-transitory computer-readable medium described above may further include processes, features, means, or instructions for selecting an TxAS configuration that comprises an SRS transmission using one port over two or more antennas.

Some examples of the method, apparatus, and non-transitory computer-readable medium described above may further include processes, features, means, or instructions for determining that the UE may have a different number of transmit paths than receive paths, wherein the TxAS configuration may be selected based at least in part on the determining.

A method of wireless communication is described. The method may include receiving a UE capability message from a UE, the UE capability message indicating a supported TxAS capability for each port of the UE, transmitting, based at least in part on the UE capability message, a configuration message to the UE indicating an UL MIMO configuration and a TxAS configuration for the UE, the configuration message indicating a TxAS configuration for the UE to use for the transmission of SRSs from each port of the UE, and receiving the SRSs in conjunction with the UL MIMO communications and according to the TxAS configuration for each port.

An apparatus for wireless communication is described. The apparatus may include means for receiving a UE capability message from a UE, the UE capability message indicating a supported TxAS capability for each port of the UE, means for transmitting, based at least in part on the UE capability message, a configuration message to the UE indicating an UL MIMO configuration and a TxAS configuration for the UE, the configuration message indicating a TxAS configuration for the UE to use for the transmission of SRSs from each port of the UE, and means for receiving the SRSs in conjunction with the UL MIMO communications and according to the TxAS configuration for each port.

Another apparatus for wireless communication is described. The apparatus may include a processor, memory in electronic communication with the processor, and instructions stored in the memory. The instructions may be operable to cause the processor to receive a UE capability message from a UE, the UE capability message indicating a supported TxAS capability for each port of the UE, transmit, based at least in part on the UE capability message, a configuration message to the UE indicating an UL MIMO configuration and a TxAS configuration for the UE, the configuration message indicating a TxAS configuration for the UE to use for the transmission of SRSs from each port of the UE, and receive the SRSs in conjunction with the UL MIMO communications and according to the TxAS configuration for each port.

A non-transitory computer readable medium for wireless communication is described. The non-transitory computer-readable medium may include instructions operable to cause a processor to receive a UE capability message from a UE, the UE capability message indicating a supported TxAS capability for each port of the UE, transmit, based at least in part on the UE capability message, a configuration message to the UE indicating an UL MIMO configuration and a TxAS configuration for the UE, the configuration message indicating a TxAS configuration for the UE to use for the transmission of SRSs from each port of the UE, and receive the SRSs in conjunction with the UL MIMO communications and according to the TxAS configuration for each port.

Some examples of the method, apparatus, and non-transitory computer-readable medium described above may further include processes, features, means, or instructions for generating the configuration message to indicate that the UE may be to use an open-loop TxAS configuration where the UE autonomously selects the TxAS configuration to use for each port when transmitting the SRSs.

Some examples of the method, apparatus, and non-transitory computer-readable medium described above may further include processes, features, means, or instructions for generating the configuration message to indicate that the UE may be to use a closed-loop TxAS configuration where the configuration message indicates the TxAS configuration to use for each port when transmitting the SRSs.

Some examples of the method, apparatus, and non-transitory computer-readable medium described above may further include processes, features, means, or instructions for identifying a number of spatial layers in two or more spatial layers associated with the UL MIMO communications. Some examples of the method, apparatus, and non-transitory computer-readable medium described above may further include processes, features, means, or instructions for selecting the TxAS configuration based at least in part on the number of spatial layers.

Some examples of the method, apparatus, and non-transitory computer-readable medium described above may further include processes, features, means, or instructions for identifying a number of spatial layers in two or more spatial layers associated with a downlink (DL) MIMO communications. Some examples of the method, apparatus, and non-transitory computer-readable medium described above may further include processes, features, means, or instructions for selecting the TxAS configuration based at least in part on the number of spatial layers.

Some examples of the method, apparatus, and non-transitory computer-readable medium described above may further include processes, features, means, or instructions for determining that the UE may have a different number of transmit paths than receive paths, wherein the TxAS configuration may be selected based at least in part on the determining.

DETAILED DESCRIPTION

Figure 1:
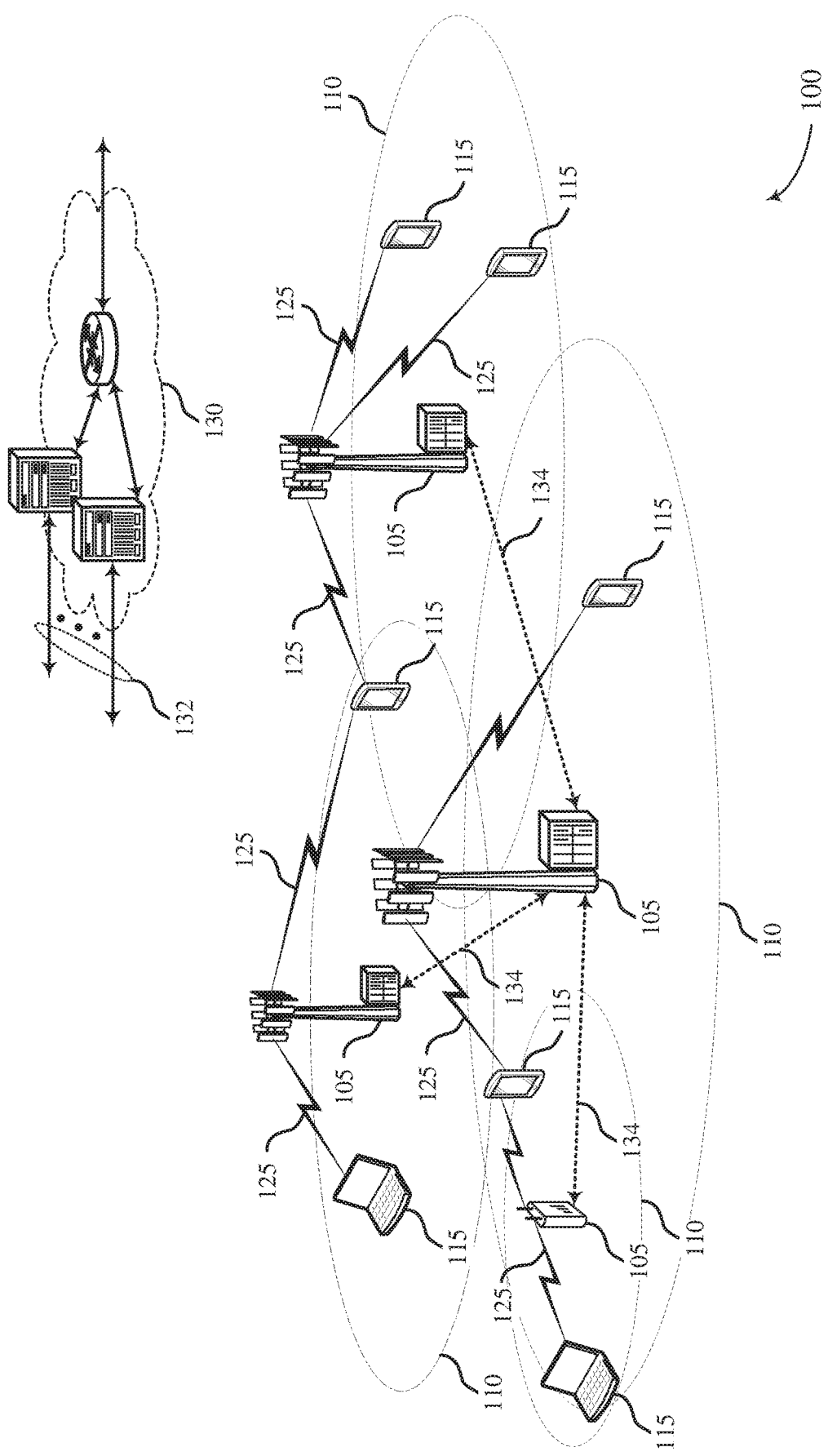
FIG. 1 illustrates an example of a system for wireless communication that supports method for transmitting sounding reference signals (SRSs) for user equipment (UE) with asymmetric transmit/receive (TX/RX) in accordance with aspects of the present disclosure.

A wireless device, such as a user equipment (UE), may be configured with multiple receivers and/or transmitters. However, asymmetry may be present in the transmit/receive paths, e.g., each path may have different performance/propagation characteristics, may have a different number of transmit/receive paths, etc. The asymmetry may lead to the UE transmitting uplink (UL) reference signals, such as sounding reference signals (SRSs), using fewer antennas/transmitters and receiving downlink (DL) channels, such as physical downlink shared channels (PDSCHs), using more antennas/receivers. For reciprocity-based DL multiple-input/multiple-output (MIMO) communications, the SRSs may be used by the base station to determine the DL MIMO precoding to be used when scheduling DL MIMO communications. In order for a base station to determine the DL MIMO precoding, the base station may conduct channel estimation for the channel associated with all antennas in the receive paths, based on SRSs transmitted by the UE. Due to asymmetry in the transmit/receive paths of the UE, however, the base station may not identify the channel associated with all the antennas in the receive paths. That is, only the channel associated with the antennas in the transmit paths can be identified. SRS transmit (TX) switching may be used in order to account for asymmetry in the transmit/receive paths of the UE. In the case of asymmetric transmit/receive, all of the receive (RX) antennas of the UE are to be sounded by connecting to the TX in a time-division multiplexing (TDM) manner (e.g., via SRS TX switching). While this process is relatively straightforward for UEs with a signal transmit path and two receive paths, scheduling transmission of the SRSs may be complicated by the multiple transmitters/antennas at the UE that are typical of uplink multiple-input/multiple-output (UL MIMO)-capable UEs.

Aspects of the disclosure are initially described in the context of a wireless communications system. In some aspects, the UE may report its capability (e.g., in a UE capability message) to the base station indicating a UL MIMO transmission capability the UE supports, the number of SRS ports the UE supports and, for each SRS port, a transmit antenna switching (TxAS) capability the UE supports. The base station may determine the use of UL MIMO transmission for the UE based at least on the UL MIMO transmission capability message. The base station may determine the SRS configuration and the TxAS configuration (e.g., in a closed-loop scenario) at least based on the capability message and the use of UL MIMO. The base station may respond with a configuration message indicating UL MIMO configuration and the SRS configuration for the UE to use. The base station may transmit a configuration message indicating the TxAS configuration for the UE to use (e.g., in a closed-loop scenario) or indicating an open-loop scenario where the UE selects the TxAS configuration to use for the SRS transmission. The UE may use the configuration message to identify a TxAS configuration to use for transmitting the SRS(s) in conjunction with the UL MIMO communications.

In some aspects, the UE may determine that UL MIMO is configured for the UE, e.g., based on the configuration message, that includes transmitting uplink communications on multiple ports of the UE (e.g., two or more transmitters, transmit chains, transmit paths, etc.) to deliver data over multiple spatial layers. The UE may identify an SRS configuration that supports SRS transmissions along with the UL MIMO communications, e.g., based on the configuration message. The SRS configuration may include the UE transmitting SRS transmissions on the multiple ports of the UE and according to the TxAS configuration for the respective port.

In some aspects, the UE may be configured to use multiple component carriers (CCs) transmitted using a common (or first) power amplifier and at least one of those CCs is configured for UL MIMO communications. The UE may identify the SRS configuration based on the common power amplifier, e.g., the SRS configuration may include using the same SRS transmission scheme for all CCs being transmitted using the common power amplifier. Accordingly, one CC configured for UL MIMO and another CC not configured for UL MIMO, but being transmitted using the common power amplifier, may use the same SRS configuration for transmission of SRSs. The UE may, in some aspects, identify the SRS configuration based on the configuration message, e.g., in response to the UE capability message transmitted to the base station.

In some aspects, the UE may identify a TxAS configuration to use for transmitting aperiodic SRSs, e.g., on-demand or as needed SRS transmissions. For example, the UE report its TxAS capability to the base station and may then be triggered for the aperiodic SRS transmissions. The UE may identify the TxAS configuration to use for the aperiodic SRS transmissions based on the trigger message received from the base station. The TxAS configuration may include the UE transmitting SRSs in multiple SRS occasions and according to a pattern indicated in the trigger. In some aspects, the aperiodic SRS transmissions may be triggered based on a trigger message received from a base station. The trigger message may explicitly indicate the TxAS configuration or the pattern (e.g., using one or more bits) or implicitly indicate the TxAS configuration or the pattern (e.g., applying a mask to bit(s) or a field in the trigger message).

In some aspects, the configuration message may include or indicate an UL CA configuration from the base station to indicate which CC(s) are to be aggregated for UL transmissions. The configuration message may include or indicate an UL MIMO configuration for the UE to use. The UL MIMO configuration may be on a per-CC basis, e.g., the UE may receive multiple UL MIMO configurations in the configuration message, with each UL MIMO configuration being for each CC in the UL CA configuration.

In some aspects, an SRS configuration may refer to the transmission of SRS(s) from a UE using a particular transmitter/antenna. For example, one or more transmitters of the UE may be connected to a transmit/receive (T/R) switches that may route the output of the transmitter to a particular antenna. In some aspects, the SRS configuration may refer to, for each port of the UE, the TxAS configuration that the UE is to use for transmission of SRS(s) in conjunction with UL MIMO communications. In some aspects, references to an SRS configuration may include how many SRS ports the UE is configured with, whether open-/closed-loop TxAS is enabled, whether TxAS is enabled or disabled, the bandwidth to be sounded, etc. In some aspects, SRS configurations may be determined by a base station based on the UE's capability, e.g., whether the UE support more than 1 SRS port, whether the UE support TxAS, etc. In some aspects, different SRS ports may have different TxAS capability. Further, some UE may not support TxAS on TX0 but can switch among different antennas on TX1. Thus, when the UE reports its capability, it may report TxAS capability respectively for each SRS port and when base station configures the SRS transmission, the base station may base the SRS transmission on such UE capability.

Aspects of the disclosure are further illustrated by and described with reference to apparatus diagrams, system diagrams, and flowcharts that relate to method for transmitting SRS for UEs with asymmetric TX/RX.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some aspects, a UE 115 may transmit a UE capability message to a base station 105, the UE capability message indicating a supported TxAS capability for each port of the UE 115. The UE 115 may receive a configuration message from the base station 105 indicating an UL MIMO configuration for the UE 115, the UL MIMO configuration being based at least in part on the UE capability message and comprising the use of two or more ports of the UE 115 for UL MIMO communications over two or more spatial layers. The UE 115 may identify, based at least in part on the configuration message, a SRS configuration to use for transmitting SRSs in conjunction with the UL MIMO communications, the SRS configuration comprising a configuration for transmission by the UE 115 of SRSs using at least one of the two or more ports of the UE 115, the SRSs transmitted on one or more antennas of the UE 115 selected according to a TxAS configuration for the respective port. The UE 115 may transmit the SRSs in conjunction with the UL MIMO communications and according to the SRS configuration.

In some aspects, a UE 115 may transmit a UE capability message to a base station 105, the UE capability message indicating a supported TxAS capability for each port of the UE 115. The UE 115 may receive a configuration message from the base station indicating an UL MIMO configuration for the UE, the UL MIMO configuration being based at least in part on the UE capability message and comprising the use of two or more ports of the UE 115 for UL MIMO communications over two or more spatial layers. The UE 115 may determine that at least one CC of two or more CCs being transmitted using a first power amplifier is configured for the UL MIMO communications in accordance with the UL MIMO configuration. The UE 115 may identify, based at least in part on the UL MIMO configuration and the received configuration message, a SRS configuration to use for transmitting SRSs in conjunction with the UL MIMO communications over the two or more CCs, the SRSs transmitted on one or more antennas of the UE 115 selected according to a TxAS configuration for the respective port. The UE 115 may transmit the SRSs in conjunction with the UL MIMO communications and according to the SRS configuration.

In some aspects, a UE 115 may transmit a UE capability message to a base station 105, the UE capability message indicating a supported TxAS capability for each port of the UE. The UE 115 may receive a trigger message from a base station 105 indicating that the UE 115 is to perform an aperiodic SRS transmission. The UE 115 may identify, based at least in part on the trigger message, a TxAS configuration for the UE 115 to use to transmit the aperiodic SRS transmission. The UE 115 may transmit the SRS transmission using one or more antennas selected based at least in part on the TxAS configuration.

In some aspects, a base station 105 may receiving a UE capability message from a UE 115, the UE capability message indicating a supported TxAS capability for each port of the UE 115. The base station 105 may transmit, based at least in part on the UE capability message, a configuration message to the UE 115 indicating an UL MIMO configuration and a TxAS configuration for the UE 115, the configuration message indicating a TxAS configuration for the UE 115 to use for the transmission of SRSs from each port of the UE 115. The base station 105 may receive the SRSs in conjunction with the UL MIMO communications and according to the TxAS configuration for each port.

Figure 2:
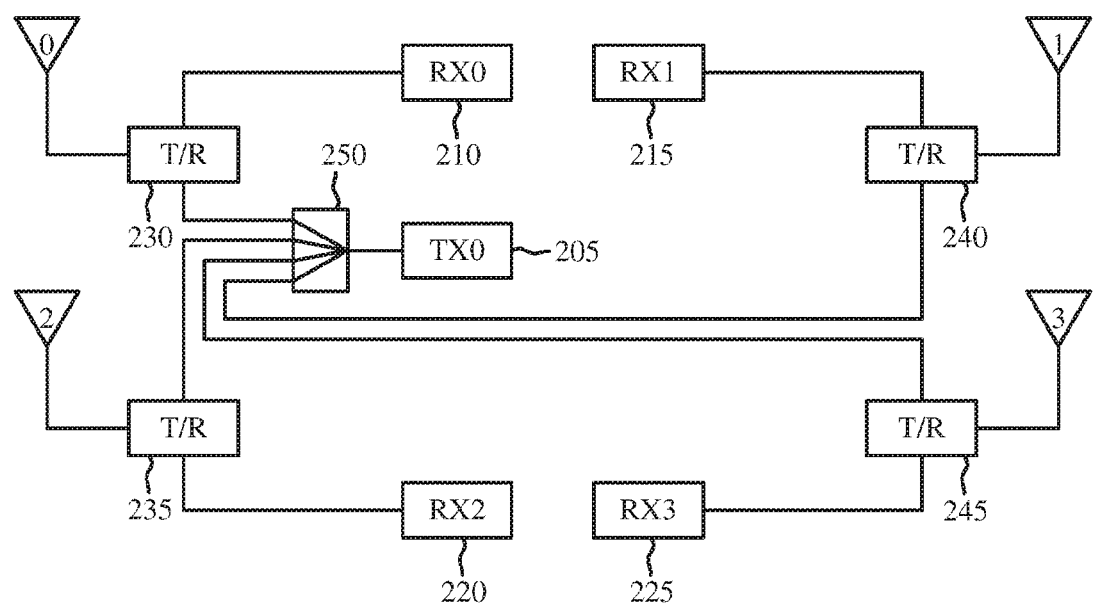
FIG. 2 illustrates an example of a UE configuration that supports method for transmitting SRS for UEs with asymmetric TX/RX in accordance with aspects of the present disclosure.

FIG. 2 illustrates an example of a UE configuration 200 that supports method for transmitting SRS for UEs with asymmetric TX/RX in accordance with various aspects of the present disclosure. In some examples, UE configuration 200 may implement aspects of wireless communication system 100. Aspects of UE configuration 200 may be implemented by a UE, which may be examples of the corresponding device described herein. Broadly, UE configuration 200 illustrates one example of a UE configuration comprising one transmitter and four receivers (e.g., 1TX/4RX).

UE configuration 200 may include a single transmitter 205 (TX0), four receivers 210 (RX0), 215 (RX1), 220 (RX2), and 225 (RX3), and four transmit/receive (T/R) switches 230, 235, 240, and 245. T/R switch 230 may switch the signal path from antenna 0 between RX0 (e.g., when the UE is configured to receive downlink signals) and TX0 (e.g., when the UE is configured for uplink transmissions). T/R switch 235 may switch the signal path from antenna 2 between RX2 and TX0. T/R switch 240 may switch the signal path from antenna 1 between RX1 and TX0. T/R switch 245 may switch the signal path from antenna 3 between RX3 and TX0. Switch 250 may route the output from TX0 to one of the T/R switches 230, 235, 240, and 245. Thus, RX0 may be connected to antenna 0, RX1 may be connected to antenna 1, RX2 may be connected to antenna 2, and RX3 may be connected to antenna 3. TX0 may be connected to any of antennas 0-3, depending on the configuration of switch 250. Thus, the TxAS capability supported by UE configuration 200 may include TX0 transmitting SRSs using any of antennas 0-3, depending upon the configuration of the corresponding T/R switch. The UE may report its TxAS capability to a base station in a UE capability message. The base station may respond with a configuration message identifying the TxAS configuration for the UE to use (e.g., either closed-loop where the base station indicates the TxAS configuration or open-looped where the open-loop indication informs the UE to select the TxAS configuration to use).

In some aspects, UE configuration 200 may be implemented when a UE is configured to sound a single SRS port using one antenna at a time, e.g., when UL MIMO is not configured for the UE. In some aspects, the UE may be configured with a single-port SRS with open-loop TxAS, e.g., via a configuration message received from a base station indicating that the UE is to select the TxAS configuration to use.

References to a port may refer a logical entity associated with the transmission of SRSs. The port may include various physical entities, such as transmitters, switches, filters, antennas, power amplifiers, and other suitable circuitry that supports transmission of SRSs. Generically, reference to a port may refer to the number of transmitters that the UE is configured with for transmitting SRSs. For example, UE configuration 200 can be configured with a single port (e.g., only one transmitter (TX0)) available for SRS transmissions using any of antennas 0-3.

Generally, an open-loop TxAS may refer to the UE selecting which antennas to use to transmit the SRSs. For example, the UE may report its TxAS capability to the base station. The base station may respond with a configuration message indicating that the SRS configuration is an open-loop SRS configuration. The open-loop indication may be identified by the UE and the UE may identify which TxAS configuration is to be sounded for a given sounding instance. In an open-loop TxAS scheme, the network may assume that only one antenna (or a known antenna switching configuration or pattern) was used for the SRS transmissions and select a DL antenna(s) based on the assumed antenna (switching configuration). The UE may then use the assumed antenna(s) for downlink reception.

In some aspects, the UE may be configured with a single-port SRS with closed-loop TxAS. Generally, a closed loop TxAS may refer to the UE receiving some indication from a base station regarding which antennas to select, e.g., in the configuration message received from the base station in response to the UE's TxAS capability report. For example, the UE may be configured (e.g., via received signaling and/or preconfigured) with predefined rules that are used to identify the TxAS configuration to use for the SRS transmissions. The UE may identify the antennas to use, but may do so in consideration of the predefined rules. Thus, when a single transmit chain (TX0) is used for transmitting SRSs and the UE is configured with $N_{ant}$ ($N_{ant}=4$ in UE configuration 200), the number of antennas (and switching pattern) to be switched when transmitting SRSs may depend on the predefined rules. As one example, the $N_{ant}$ may be less than or equal to the maximum number of spatial layers being transmitted in the downlink. The maximum number of spatial layers being transmitted in the downlink may be reported to the base station, e.g., in a UE radio access capability parameters indication. In some examples where $N_{ant}$ is not explicitly configured to the UE, the UE may assume $N_{ant}$ may be equal to the maximum number of downlink spatial layers.

In some aspects, in each sounding instance the UE may sounds one out of $N_{ant}$ antennas, sequentially. For example, if $N_{ant}=4$, the UE may sound antenna $n=(N_{SRS}+\Delta_{SRS})$ mod $N_{ant}$ in the $N_{SRS}$-th sounding instance, where $\Delta_{SRS}$ is configured by the base station with a value in the set $\{0, 1, \ldots, N_{ant}-1\}$, or may be fixed to 0.

Thus, the UE can be configured to sound from a certain number of antennas to enable TxAS and the exact number of antennas (and switching pattern) to be used can be defined based on certain predefined rules, may be configured by the base station, etc. The selected antennas may be sounded sequentially and this may allow the base station to know which antennas were selected for the SRS transmissions.

Figure 3:
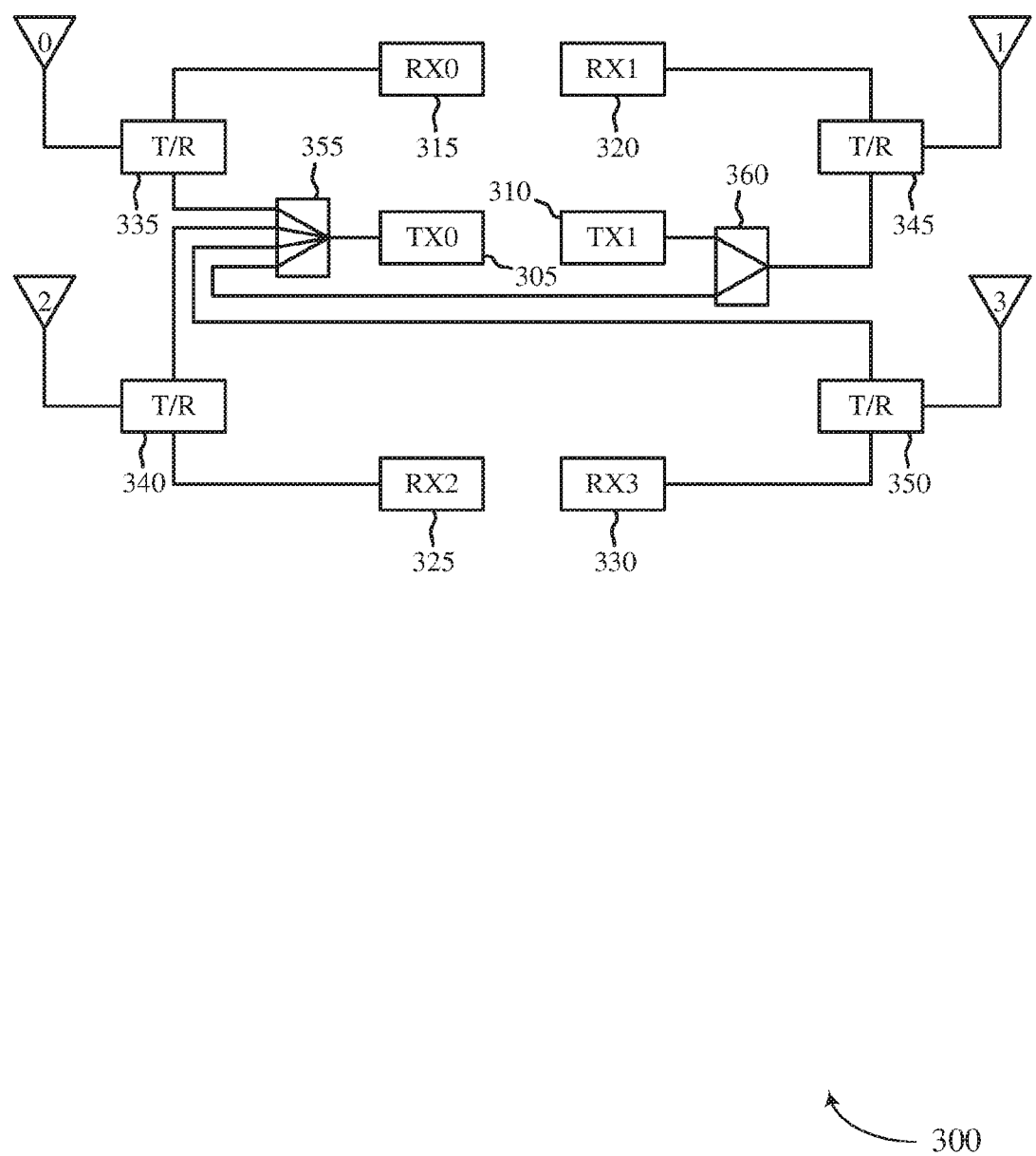
FIG. 3 illustrates an example of a UE configuration that supports method for transmitting SRS for UEs with asymmetric TX/RX in accordance with aspects of the present disclosure.

FIG. 3 illustrates an example of a UE configuration 300 that supports method for transmitting SRS for UEs with asymmetric TX/RX in accordance with various aspects of the present disclosure. In some examples, UE configuration 300 may implement aspects of wireless communication system 100 and/or UE configuration 200. Aspects of UE configuration 300 may be implemented by a UE, which may be examples of the corresponding device described herein. Broadly, UE configuration 300 illustrates one example of a UE configuration comprising two transmitters and four receivers (e.g., 2TX/4RX).

UE configuration 300 may include a transmitter 305 (TX0) and a transmitter 310 (TX1), four receivers 315 (RX0), 320 (RX1), 325 (RX2), and 330 (RX3), and four T/R switches 335, 340, 345, and 350. T/R switch 335 may switch the signal path from antenna 0 between RX0 (e.g., when the UE is configured to receive downlink signals) and TX0 (e.g., when the UE is configured for uplink transmissions). T/R switch 340 may switch the signal path from antenna 2 between RX2 and TX0. T/R switch 345 may switch the signal path from antenna 1 between RX1 and TX1, or between RX1 and TX0 depending upon the configuration of switch 360. T/R switch 350 may switch the signal path from antenna 3 between RX3 and TX0. Switch 355 may route the output from TX0 to one of the T/R switches 335, 340, 345 (depending upon the configuration of switch 360), and 350. Thus, RX0 may be connected to antenna 0, RX1 may be connected to antenna 1, RX2 may be connected to antenna 2, and RX3 may be connected to antenna 3. TX0 may be connected to any of antennas 0-3, depending on the configuration of switch 355 and/or switch 360. TX1 may be connected to antenna 1, depending upon switch 360. Thus, the TxAS capability supported by UE configuration 300 may include TX0 transmitting SRSs using any of antennas 0-3 and TX1 transmitting the SRSs using antenna 1, depending upon the configuration of the corresponding T/R switch. The UE may report its TxAS capability to a base station in a UE capability message. The base station may respond with a configuration message identifying the TxAS configuration for the UE to use.

Generally, UE configuration 300 may support UL MIMO being configured for the UE. The UE may identify a SRS configuration to use based on the configuration message and/or the determination that the UL MIMO will be over multiple spatial layers and using multiple ports of the UE. The UL MIMO may be enabled for the UE in a non-CA mode, e.g., without using CCs to transmit the UL MIMO communications. The UE may be configured with rank-MUL MIMO and have P SRS ports with TxAS supported. In some aspects, P is less than M For example where M=4, the UE may be configured with one port or two port SRS with TxAS. In some aspects, P is the same as M, and therefore TxAS may not be needed. The SRS TxAS configuration may be open-loop where the UE determines which P antennas are to be sounded for a given sounding instance and for a particular port. In the example UE configuration 300, the UE may be configured with one port SRS using TX0. As TX0 can be connected to any of antennas 0-3, the UE may use any of antennas 0-3 for SRS transmissions, e.g., depending upon the TxAS configuration.

In some aspects, the SRS TxAS configuration may be closed-loop where the UE is configured with $N_{ant}$, where $N_{ant}$ is the number of antennas to be switched between when transmitting SRSs. The closed-loop SRS TxAS configuration may be based on a configuration message received from a base station, e.g., the base station may select the TxAS configuration based on the UE capability report and indicate the TxAS configuration to the UE in the configuration message. In each sounding instance, the UE may sounds P out of the $N_{ant}$ antennas. In some aspects, the $N_{ant}$ may be sounded sequentially. In some aspects, $N_{ant}$ may be less than or equal to the maximum number of spatial layers in the downlink. As one non-limiting example, a UE may be configured (such as is shown in UE configuration 500-a of FIG. 5A) for TX0 where $N_{ant}$=P=1 and for TX1 where $N_{ant}$=3 and P=1. In some examples, the configuration message may indicate to the UE that a separate TxAS configuration may be used for each port (e.g., for each of TX0 and TX1). In some aspects, if $N_{ant}$ is not explicitly configured to a UE, the UE may assume $N_{ant}$ equals to the maximum number of downlink spatial layers reported in UE radio access capability parameters. Thus, the UE may identify the SRS configuration based on the number of spatial layers associated with the UL MIMO, e.g., using the same or fewer number of antennas as the number of spatial layers.

In some aspects, the configuration message may be based at least in part on a UE capability message (or report) from the UE. For example, the UE may transmit a UE capability message to the base station indicating what capability the UE has for supporting TxAS for each SRS port. In one non-limiting example where a UE can support up to two SRS ports, the UE capability message may indicate that the first SRS port may not support TxAS, but the second SRS port may support TxAS using multiple antennas (e.g., 2, 3, 4, etc. antennas). In another non-limiting example where a UE can support up to two SRS ports, the UE capability message may indicate that the first SRS port may support TxAS on two antennas and the second SRS port may support TxAS using two antennas (e.g., two antennas different from the two antennas used by the first SRS port).

The base station may configure the configuration message to indicate the TxAS configuration based on the UE capability message. For example, if the UE capability message indicates that the UE can support up to rank 4 DL MIMO and up to rank 2 UL MIMO, this may indicate that the UE can support up to two SRS ports if UL MIMO is configured and the UE has at least four receive antennas. The UE capability message may also indicate that for the p-th SRS port, the UE supports TxAS for $N_{ant}^{(p)}$ antennas. Thus, in one example $(N_{ant}^{(1)}, N_{ant}^{(2)})=(2,2)$ (as shown in UE configuration 400 of FIG. 4). In another example $(N_{ant}^{(1)}, N_{ant}^{(2)})=(1,3)$ (as shown in UE configuration 500-a of FIG. 5A), e.g., the base station cannot configure TxAS for the first SRS port in the configuration message.

Thus, in some aspects the UE may determine or otherwise identify the UL MIMO configuration for the UE, e.g., based on the configuration message. The UL MIMO configuration may include the use of two or more ports (e.g., TX0 and TX1) of the UE configuration 300 for UL MIMO communications. The UE may identify, based at least in part on the configuration message and the UL MIMO configuration, a SRS configuration to use for transmitting SRSs in conjunction with the UL MIMO communications. The SRS configuration may include the UE transmitting SRSs using at least one of the two or more ports of the UE (e.g., TX0 in the example UE configuration 300). The UE may transmit the SRSs in conjunction with the UL MIMO communications and according to the SRS configuration. In some aspects, the UE may identify the SRS configuration based on the fact that there is a different number of transmit and receive paths. In one example of UE configuration 300, the UE may identify TX0 for SRS transmissions and use TX0 and TX1 for UL MIMO communications.

Figure 4:
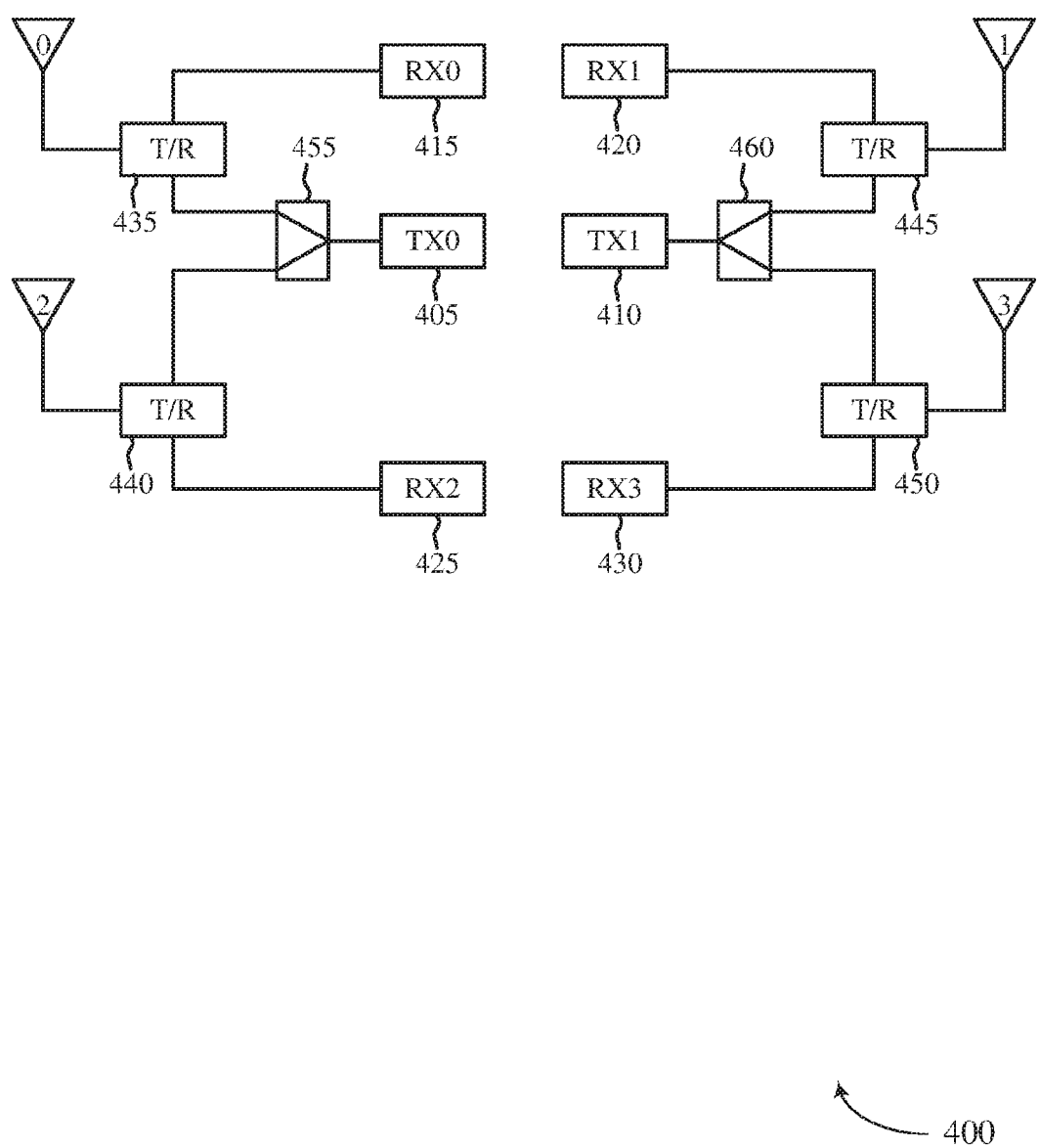
FIG. 4 illustrates an example of a UE configuration that supports method for transmitting SRS for UEs with asymmetric TX/RX in accordance with aspects of the present disclosure.

FIG. 4 illustrates an example of a UE configuration 400 that supports method for transmitting SRS for UEs with asymmetric TX/RX in accordance with various aspects of the present disclosure. In some examples, UE configuration 400 may be implemented by a UE, which may be examples of the corresponding device described herein. Broadly, UE configuration 400 illustrates one example of a UE configuration comprising two transmitters and four receivers (e.g., 2TX/4RX).

UE configuration 400 may include a transmitter 405 (TX0) and transmitter 410 (TX1), four receivers 415 (RX0), 420 (RX1), 425 (RX2), and 430 (RX3), and four T/R switches 435, 440, 445, and 450. T/R switch 435 may switch the signal path from antenna 0 between RX0 (e.g., when the UE is configured to receive downlink signals) and TX0 (e.g., when the UE is configured for uplink transmissions). T/R switch 440 may switch the signal path from antenna 2 between RX2 and TX0. T/R switch 445 may switch the signal path from antenna 1 between RX1 and TX1. T/R switch 450 may switch the signal path from antenna 3 between RX3 and TX1. Switch 455 may route the output from TX0 to one of the T/R switches 435 and 440. Thus, RX0 may be connected to antenna 0, RX1 may be connected to antenna 1, RX2 may be connected to antenna 2, and RX3 may be connected to antenna 3. TX0 may be connected to any of antennas 0 and 2, depending on the configuration of switch 455. TX1 may be connected to antenna 1 or 3, depending upon the configuration of switch 460. Thus, the TxAS capability supported by UE configuration 400 may include TX0 transmitting SRSs using antennas 0 or 2 and TX1 transmitting the SRSs using antennas 1 or 3, depending upon the configuration of the corresponding T/R switch. The UE may report its TxAS capability to a base station in a UE capability message. The base station may respond with a configuration message identifying the TxAS configuration for the UE to use.

Generally, UE configuration 400 may support UL MIMO being configured for the UE. The UE may select a SRS configuration to use based on the determination that the UL MIMO will be over multiple spatial layers and/or using multiple ports of the UE. The UL MIMO may be enabled for the UE in a non-CA mode, e.g., without using CCs to transmit the UL MIMO communications. The UE with N antennas may be configured with up to rank-M UL MIMO and have P SRS ports with TxAS, where N≥M. In some aspects, P is less than M. For example where N=M=4, the UE may be configured with one port or two port SRS with TxAS. The SRS TxAS may be open-loop where the UE determines which one or two antennas are to be sounded for a given sounding instance. In the example UE configuration 400, the UE may be configured with two port SRS using TX0 and TX1. As TX0 can be connected to antennas 0 and 2 and TX1 may be connected to antennas 1 and 3, the UE may select antennas 0-3 for SRS transmissions using TX0 and TX1.

In some aspects, the SRS TxAS configuration may be closed-loop where the UE is configured with $N_{ant}$, where $N_{ant}$ is the number of antennas to be switched between when transmitting SRSs. The closed-loop SRS TxAS may be based on a configuration message received from a base station. In each sounding instance, the UE may sounds P out of the $N_{ant}$ antennas. In some aspects, the $N_{ant}$ may be sounded sequentially. In some aspects, $N_{ant}$ may be less than or equal to the maximum number of spatial layers in the downlink. In some examples, the configuration message may indicate to the UE that a separate TxAS configuration may be used for each port (e.g., for each of TX0 and TX1). In some aspects, if $N_{ant}$ is not explicitly configured to a UE, the UE may assume $N_{ant}$ equals to the maximum number of downlink spatial layers reported in UE radio access capability parameters. Thus, the UE may identify the SRS configuration based on the number of spatial layers associated with the UL MIMO, e.g., using the same or fewer number of antennas as the number of spatial layers.

Thus, in some aspects the UE may determine or otherwise identify the UL MIMO configuration for the UE. The UL MIMO configuration may include the use of two or more ports (e.g., TX0 and TX1) of the UE configuration 400 for UL MIMO communications. The UE may identify, based at least in part on the UL MIMO configuration and the configuration message, a SRS configuration to use for transmitting SRSs in conjunction with the UL MIMO communications. The SRS configuration may include the UE transmitting SRSs using at least one of the two or more ports of the UE (e.g., TX0 and TX1 in the example UE configuration 400). The UE may transmit the SRSs in conjunction with the UL MIMO communications and according to the SRS configuration. In some aspects, the UE may identify the SRS configuration based on the fact that there are a different number of transmit and receive chains/paths.

Figure 5A:
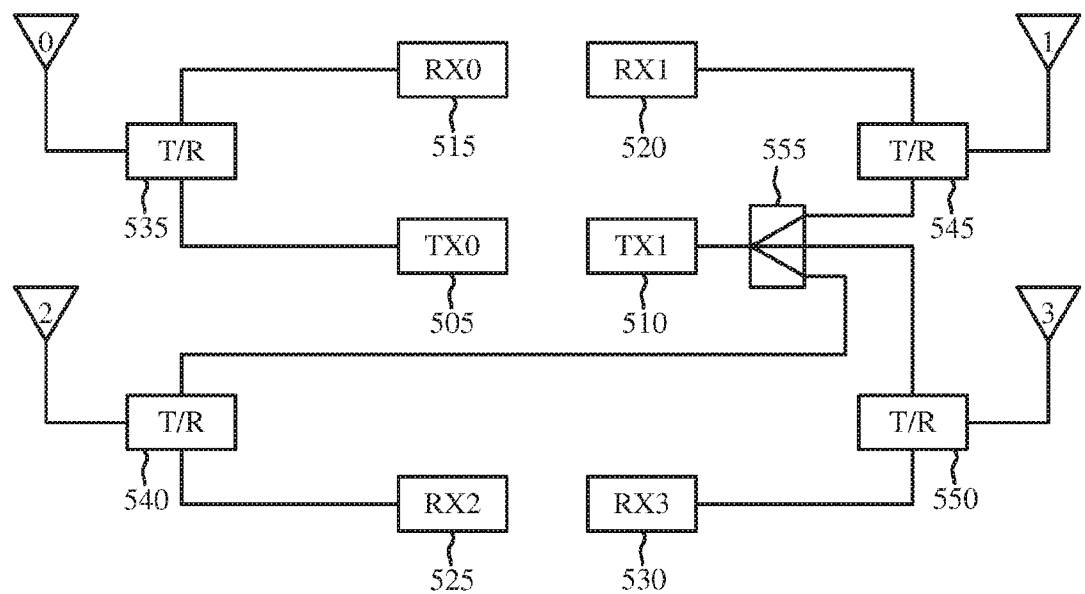
FIGS. 5A and 5B illustrate examples of a UE configuration and timing diagram, respectively, that supports method for transmitting SRS for UEs with asymmetric TX/RX in accordance with aspects of the present disclosure.
Figure 5B:
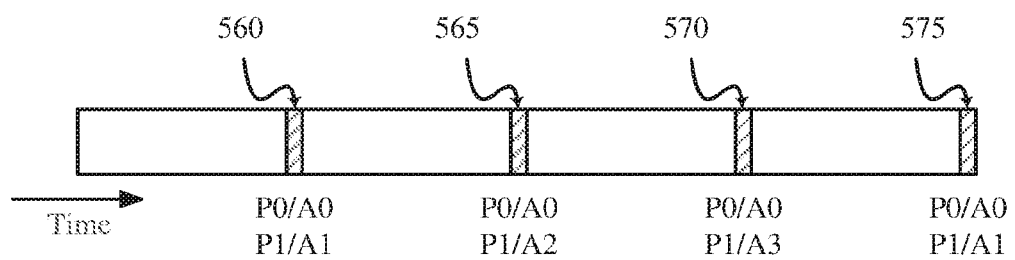

FIGS. 5A and 5B illustrate examples of a UE configuration 500-a and a timing diagram 500-b, respectively, that supports method for transmitting SRS for UEs with asymmetric TX/RX in accordance with various aspects of the present disclosure. In some examples, UE configuration 500-a and/or timing diagram 500-b may implement aspects of wireless communication system 100 and/or UE configurations 200/300/400. Aspects of UE configuration 500-a and/or timing diagram 500-b may be implemented by a UE, which may be examples of the corresponding device described herein. Broadly, UE configuration 500-a illustrates one example of a UE configuration comprising two transmitters and four receivers (e.g., 2TX/4RX).

UE configuration 500-a may include a transmitter 505 (TX0) and transmitter 510 (TX1), four receivers 515 (RX0), 520 (RX1), 525 (RX2), and 530 (RX3), and four T/R switches 535, 540, 445, and 550. T/R switch 535 may switch the signal path from antenna 0 between RX0 (e.g., when the UE is configured to receive downlink signals) and TX0 (e.g., when the UE is configured for uplink transmissions). T/R switch 540 may switch the signal path from antenna 2 between RX2 and TX1, depending upon the configuration of switch 555. T/R switch 545 may switch the signal path from antenna 1 between RX1 and TX1, depending upon the configuration of switch 555. T/R switch 550 may switch the signal path from antenna 3 between RX3 and TX1, depending upon the configuration of switch 555. Switch 555 may route the output from TX1 to one of the T/R switches 540, 545, and 550. Thus, RX0 may be connected to antenna 0, RX1 may be connected to antenna 1, RX2 may be connected to antenna 2, and RX3 may be connected to antenna 3. TX0 may be connected to antenna 0. TX1 may be connected to any of antennas 1-3, depending upon the configuration of switch 555. Thus, the TxAS capability supported by UE configuration 500-a may include TX0 transmitting SRSs using antenna 0 and TX1 transmitting the SRSs using antennas 1-3, depending upon the configuration of the corresponding T/R switch. The UE may report its TxAS capability to a base station in a UE capability message. The base station may respond with a configuration message identifying the TxAS configuration for the UE to use.

Generally, UE configuration 500-*a* may support UL MIMO being configured for the UE. The UE may select a SRS configuration to use based on the determination that the UL MIMO will be over multiple spatial layers and/or using multiple ports of the UE. The UL MIMO may be enabled for the UE in a non-CA mode, e.g., without using CCs to transmit the UL MIMO communications. The UE with N antennas may be configured with up to rank-M UL MIMO and have P SRS ports with TxAS, where N≥M. In some aspects, P is less than M For example where N=M=4, the UE may be configured with one port or two port SRS (e.g., P-port SRS, where P=1 or 2) with TxAS. The SRS TxAS may be open-loop where the UE determines which P antennas are to be sounded for a given sounding instance. In the example UE configuration 500-*a*, the UE may be configured with two port SRS using TX0 and TX1. As TX0 can be always connected to antenna 0 and TX1 may be connected to antennas 1-3, the UE may select antennas 0-3 for SRS transmissions using TX0 and TX1.

In some aspects, the SRS TxAS may be closed-loop (e.g., configured by the base station) where the UE is configured with $N_{ant}$, where $N_{ant}$ is the number of antennas to be switched between when transmitting SRSs. The closed-loop SRS TxAS may be based on a configuration message received from a base station. The configuration message may be received in response to the UE capability message transmitted to the base station. In each sounding instance, the UE may sounds P out of the $N_{ant}$ antennas. In some aspects, the $N_{ant}$ may be sounded sequentially. In some aspects, $N_{ant}$ may be less than or equal to the maximum number of spatial layers in the downlink. In some examples, the configuration message may indicate to the UE that a separate TxAS configuration may be used for each port (e.g., for each of TX0 and TX1). In some aspects, if $N_{ant}$ is not explicitly configured to a UE, the UE may assume $N_{ant}$ equals to the maximum number of downlink spatial layers reported in UE radio access capability parameters. Thus, the UE may identify the SRS configuration based on the number of spatial layers associated with the UL MIMO, e.g., using the same or fewer number of antennas as the number of spatial layers.

The UE capability message may indicate respectively the maximum number of antennas to be switched between when transmitting SRS from each SRS port. The base station may, based on such UE capability report, separately configure the number of antennas to be switched between when transmitting SRS from each SRS port. In the example UE configuration 500-*a*, the UE capability report may indicate that the UE supports up to rank-2 UL MIMO which implies up to 2 SRS ports can be supported. The UE capability report may further indicate that the first SRS port may not support TxAS while the second SRS port supports TxAS. The UE capability report may further indicate that the second SRS port support TxAS using three antennas. The gNB may, based on the UE capability report, configure the UE with up to rank-2 UL MIMO and 2 SRS ports.

In some aspects, the UE may determine or otherwise identify the UL MIMO configuration for the UE, e.g., based on the configuration message. The UL MIMO configuration may include the use of two or more ports (e.g., TX0 and TX1) of the UE configuration 500-*a* being used for UL MIMO communications. The UE may identify, based at least in part on the UL MIMO configuration and the configuration message, a SRS configuration to use for transmitting SRSs in conjunction with the UL MIMO communications. The SRS configuration may include the UE transmitting SRSs using at least one of the two or more ports of the UE (e.g., TX0 and TX1 in the example UE configuration 500-*a*). The UE may transmit the SRSs in conjunction with the UL MIMO communications and according to the SRS configuration. In some aspects, the UE may identify the SRS configuration based on the fact that there a different number of transmit and receive chains/paths.

With reference to timing diagram 500-*b*, in some examples the SRS switching according to the TxAS configuration may be separately configured for each SRS port (e.g., a separate SRS switching for TX0 and for TX1). For example, when P=2 the TxAS configuration may not be configured for SRS port 0 (TX0), but may be configured for SRS port 1 with $N_{ant}$=3. In another example, when P=2 the TxAS may be configured for SRS port 0 (TX0) and for SRS port 1 with $N_{ant}$=4, but with different SRS configurations being selected for the different ports.

Thus, at SRS opportunity 560, the SRS configuration may include the UE transmitting an SRS using SRS port 0 (TX0) on antenna 0 and an SRS using SRS port 1 (TX1) using antenna 1. At SRS opportunity 565, the SRS configuration may include the UE transmitting an SRS using SRS port 0 (TX0) on antenna 0 and an SRS using SRS port 1 (TX1) using antenna 2. At SRS opportunity 570, the SRS configuration may include the UE transmitting an SRS using SRS port 0 (TX0) on antenna 0 and an SRS using SRS port 1 (TX1) using antenna 3. At SRS opportunity 575, the SRS configuration may include the UE transmitting an SRS using SRS port 0 (TX0) on antenna 0 and an SRS using SRS port 1 (TX1) using antenna 1. Thus, the SRS configuration for port 1 may include the UE transmitting SRSs by cycling sequentially through antennas 1-3.

Figure 6A:
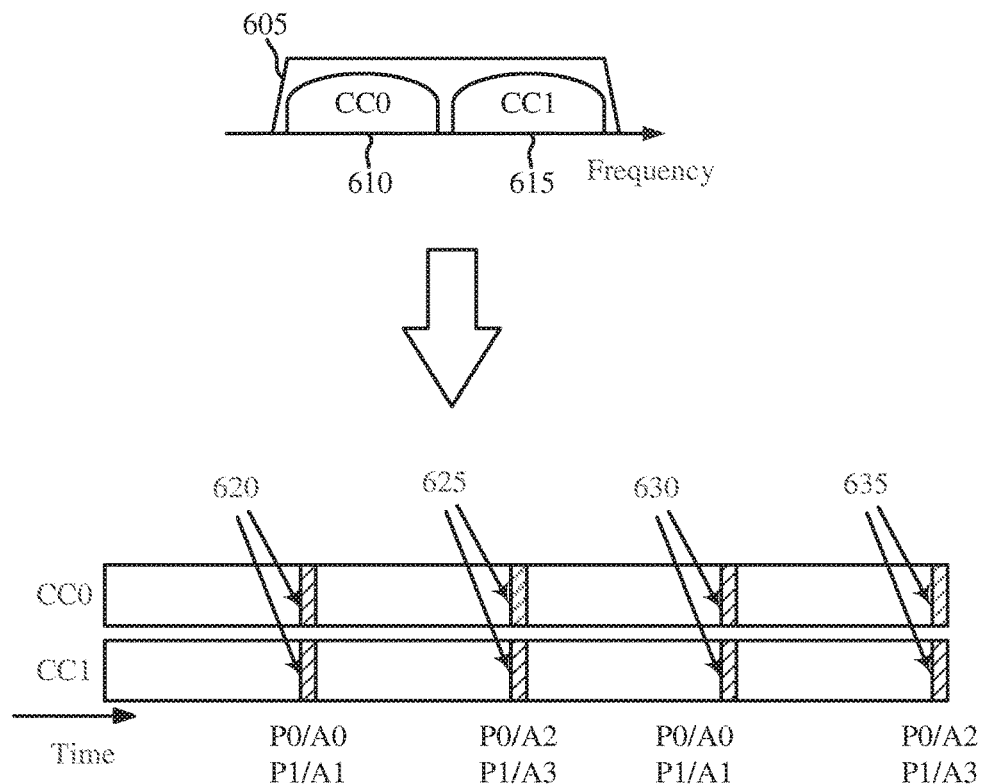
FIGS. 6A and 6B illustrate examples of SRS configurations that supports method for transmitting SRS for UEs with asymmetric TX/RX in accordance with aspects of the present disclosure.
Figure 6B:
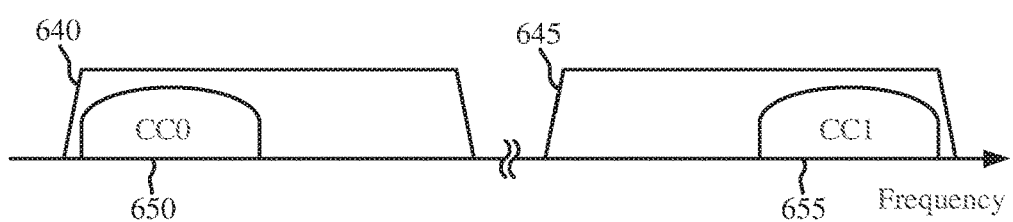

FIGS. 6A and 6B illustrate examples of an SRS configuration 600 that supports method for transmitting SRS for UEs with asymmetric TX/RX in accordance with various aspects of the present disclosure. In some examples, SRS configuration 600 may implement aspects of wireless communication system 100 and/or UE configurations 200/300/400/500. Aspects of SRS configurations 600-*a* and/or 600-*b* may be implemented by a UE, which may be examples of the corresponding device described herein. Broadly, SRS configurations 600-*a* and 600-*b* illustrate one example of SRS configuration including SRS transmissions when CA UL MIMO is configured for the UE.

In some aspects, the CA UL MIMO configuration may be on a per CC basis. SRS TxAS may be supported depending on the number of power amplifiers (PAs) that are used for an UL MIMO transmission. For multiple CCs transmitting through a single uplink power amplifier, if any CC is configured for UL MIMO communications, the SRS transmissions on the other CCs via the same power amplifier may be treated the same as non-CA UL MIMO communications. For example, if 2-port SRS with TxAS is enabled, the selected 2 antennas may be the same across the CCs.

For example and with reference to SRS configuration 600-*a*, a first CC 610 (CC0) and second CC 615 (CC1) may be configured for transmission in a band 605 (e.g., intra-band CCs) using a common power amplifier. The UE may identify or otherwise determine that at least one of the CCs (e.g., CC0 or CC1) of the two CCs (e.g., CC0 and CC1) are being transmitted using a common power amplifier and is configured for UL MIMO communications. The UE may identify, based at least in part on the UL MIMO configuration and the configuration message, a SRS configuration to use for transmitting SRSs in conjunction with the UL MIMO communications over two CCs (e.g., CC0 and CC1). The UE may transmit the SRSs in conjunction with the UL MIMO communications and according to the SRS configuration.

In some aspects, the SRS configuration may include the UE transmitting the same SRSs on both CCs using the same SRS configuration, e.g., even when the other CC(s) are not configured for UL MIMO communications. For example and with reference to the timing diagram, at SRS opportunity 620, the SRS configuration may include the UE transmitting a SRS using SRS port 0 (TX0) on antenna 0 and a SRS using SRS port 1 (TX1) using antenna 1 on both CCs (e.g., CC0 and CC1). At SRS opportunity 625, the SRS configuration may include the UE transmitting a SRS using SRS port 0 (TX0) on antenna 2 and a SRS using SRS port 1 (TX1) using antenna 3 on both CCs (e.g., CC0 and CC1). At SRS opportunity 630, the SRS configuration may include the UE transmitting a SRS using SRS port 0 (TX0) on antenna 0 and a SRS using SRS port 1 (TX1) using antenna 1 on both CCs (e.g., CC0 and CC1). At SRS opportunity 635, the SRS configuration may include the UE transmitting a SRS using SRS port 0 (TX0) on antenna 2 and a SRS using SRS port 1 (TX1) using antenna 3 on both CCs (e.g., CC0 and CC1).

With reference to SRS configuration 600-b, in some aspects the SRS configuration may include the UE transmitting one CC using the common (or first) power amplifier and according to a first SRS configuration and transmitting another CCs using a second power amplifier and according to a second SRS configuration. The common power amplifier may be different from the second power amplifier. In some aspects, at least one CC is transmitted in a first band and the other CC(s) are transmitted in a second band that is different from the first band, e.g., inter-band CCs. For example, a first CC 650 (CC0) is transmitted in a first band 640 and a second CC 655 (CC1) is transmitted in a second band 645. The first band 640 may be a different band than the second band 645.

Thus, the SRS dependency on UL MIMO may be treated on a per CC basis. For example, in case of inter-band CA with 2 CCs, each CC may be connected to a set of power amplifiers separately, then the SRS dependency on UL MIMO can be separately treated on each CC.

Figure 7:
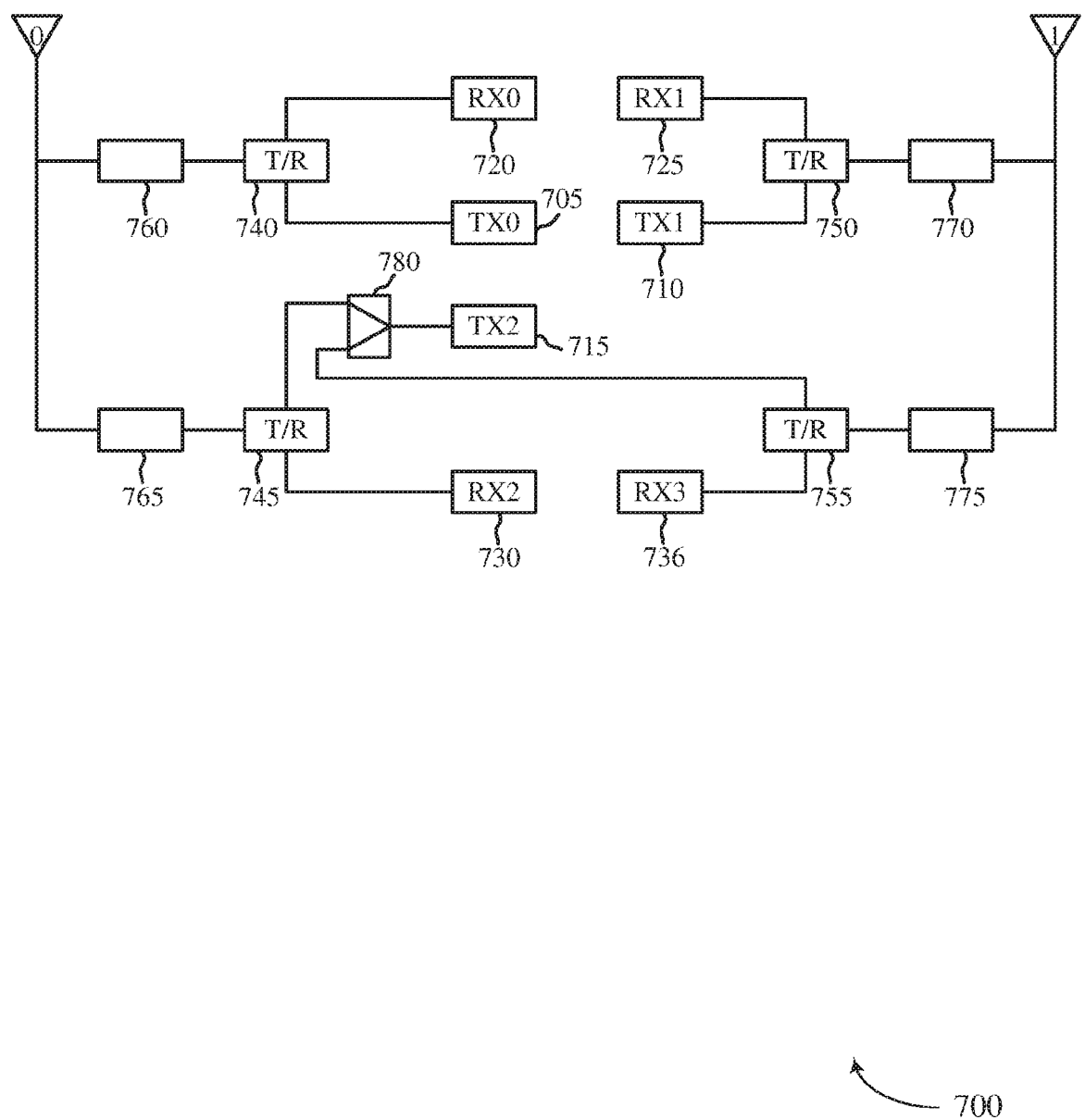
FIG. 7 illustrates an example of a UE configuration that supports method for transmitting SRS for UEs with asymmetric TX/RX in accordance with aspects of the present disclosure.

FIG. 7 illustrates an example of a UE configuration 700 that supports method for transmitting SRS for UEs with asymmetric TX/RX in accordance with various aspects of the present disclosure. In some examples, UE configuration 700 may implement aspects of wireless communication system 100 and/or UE configurations 200/300/400/500-a, timing diagram 500-b, and/or SRS configurations 600-a and 600-b. Aspects of UE configuration 700 may be implemented by a UE, which may be examples of the corresponding device described herein. Broadly, UE configuration 700 illustrates one example of a UE configuration comprising three transmitters and four receivers (e.g., 3TX/4RX).

UE configuration 700 may include a transmitter 705 (TX0), a transmitter 710 (TX1), and transmitter 715 (TX2), four receivers 720 (RX0), 725 (RX1), 730 (RX2), and 735 (RX3), and four T/R switches 740, 745, 750, and 755. T/R switch 740 may switch the signal path from antenna 0 between RX0 (e.g., when the UE is configured to receive downlink signals) and TX0 (e.g., when the UE is configured for uplink transmissions). T/R switch 745 may switch the signal path from antenna 0 between RX2 and TX2, depending upon the configuration of switch 780. T/R switch 750 may switch the signal path from antenna 1 between RX1 and TX1. T/R switch 755 may switch the signal path from antenna 1 between RX3 and TX2, depending upon the configuration of switch 780. Switch 780 may route the output from TX2 to one of the T/R switches 745 and 755. Thus, RX0 and RX2 may be connected to antenna 0 and RX1 and RX3 may be connected to antenna 1. TX0 may be connected to antenna 0. TX1 may be connected to antenna 1. TX2 may be connected to either of antennas 0 or 1, depending upon the configuration of switch 780. Thus, the TxAS capability supported by UE configuration 700 may include TX0 transmitting SRSs using antenna 0, TX1 transmitting the SRSs using antenna 1, and TX2 transmitting SRSs using antennas 0 or 1, depending upon the configuration of the corresponding T/R switch. The UE may report its TxAS capability to a base station in a UE capability message. The base station may respond with a configuration message identifying the TxAS configuration for the UE to use.

In some aspects, the CA UL MIMO configuration may be on a per CC basis. SRS TxAS may be supported depending on the number of power amplifiers (PAs) that are used for an UL MIMO transmission. For multiple CCs transmitting through a single uplink power amplifier, if any CC is configured for UL MIMO communications, the SRS transmissions on the other CCs via the same power amplifier may be treated the same as non-CA UL MIMO communications. For example, if 2-port SRS with TxAS is enabled, the selected 2 antennas may be the same across the CCs.

For example, a first CC (CC0) and second CC (CC1) may be configured for transmission in a band (e.g., intra-band CCs) using a common power amplifier. The UE may identify or otherwise determine that at least one of the CCs (e.g., CC0 or CC1) of the two CCs (e.g., CC0 and CC1) are being transmitted using a common (or first) power amplifier and is configured for UL MIMO communications. The UE may identify, based at least in part on the UL MIMO configuration, a SRS configuration to use for transmitting SRSs in conjunction with the UL MIMO communications over two CCs (e.g., CC0 and CC1). The UE may transmit the SRSs in conjunction with the UL MIMO communications and according to the SRS configuration.

In some aspects, the SRS configuration may include the UE transmitting one CC using the common (or first) power amplifier and according to a first SRS configuration and transmitting another CCs using a second power amplifier and according to a second SRS configuration. The common power amplifier may be different from the second power amplifier. In some aspects, at least one CC is transmitted in a first band and the other CC(s) are transmitted in a second band that is different from the first band, e.g., inter-band CCs. For example, a first CC (CC0) is transmitted in a first band and a second CC (CC1) is transmitted in a second band. The first band may be a different band than the second band.

Thus, the SRS dependency on UL MIMO may be treated on a per CC basis. For example, in case of inter-band CA with 2 CCs, each CC may be connected to a set of power amplifiers separately, then the SRS dependency on UL MIMO can be separately treated on each CC.

Figure 8A:
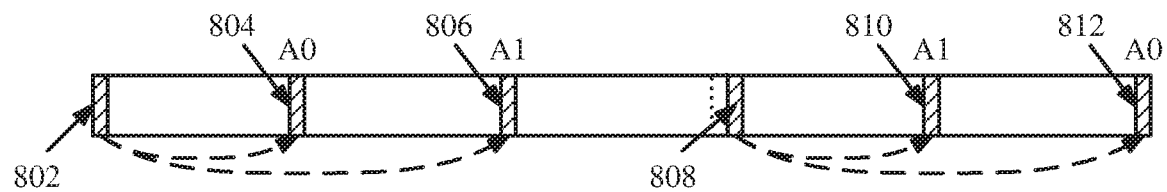
FIGS. 8A, 8B, and 8C illustrate examples of timing diagrams that supports method for transmitting SRS for UEs with asymmetric TX/RX in accordance with aspects of the present disclosure.
Figure 8B:
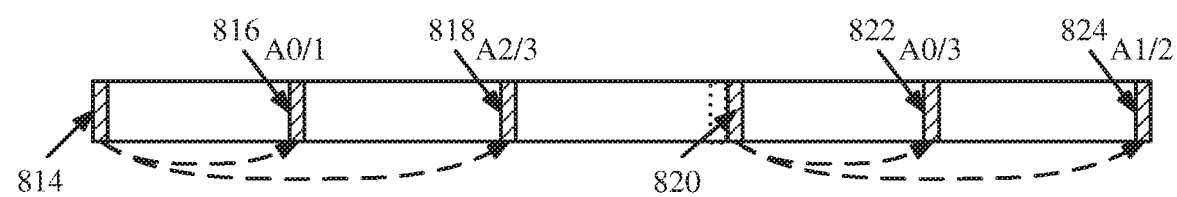
Figure 8C:
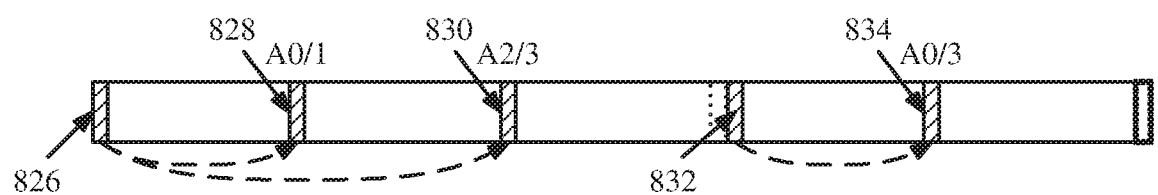

FIGS. 8A, 8B, and 8C illustrate examples of a timing diagram 800 that supports method for transmitting SRS for UEs with asymmetric TX/RX in accordance with various aspects of the present disclosure. In some examples, timing diagram 800 may implement aspects of wireless communication system 100 and/or UE configurations 200/300/400/500-a/700, timing diagram 500-b, and/or SRS configurations 600-a and 600-b. Aspects of timing diagram 800 may be implemented by a UE, which may be examples of the corresponding device described herein. Broadly, timing diagram 800 illustrates one example of aperiodic SRS transmissions in a non-CA deployment.

In some aspects, the UE may be configured with 1 SRS port (e.g., TX0) and $N_{ant}$. In one option, the aperiodic SRS trigger may include a K-bit indication to indicate which one out of the $N_{ant}$ antennas the SRS port will be associated with. K may be decided using=$[\log_2 N_{ant}]$. For example, if $N_{ant}$=4, the base station may include bit(s) such as "00" to indicate the 1st antenna, "01" to indicate the 2nd antenna, "10" to indicate the 3rd antenna, and "11" to indicate the 4th antenna. In another option, the selected antenna may be indicated by masking a field in the trigger message (e.g., a CRC field of PDCCH DCI) to indicate which one out of the $N_{ant}$ antennas the UE will use for the aperiodic SRS transmission.

In some aspects, when a UE is configured with a closed-loop SRS TxAS, the aperiodic SRS trigger message may further include an indication of which antennas shall be used for transmitting the aperiodic SRSs. When a UE is configured with M>1 SRS ports and $N_{ant}$, two or more options may be utilized. In a first option, the UE may be configured with multiple M-antenna selection candidates via higher-layer signaling. The aperiodic SRS trigger may include an indication to indicate one of the preconfigured antenna selection candidates shall be used for sending M SRS ports. In a second option, the M-antenna selection can be indicated by masking CRC field of PDCCH DCI with one out of many UE antenna selection masks, each associated with a predefined M-antenna selection candidate or preconfigured via higher-layer signaling.

In some aspects, a two bit trigger may indicate a pattern of antennas for the UE to use to transmit the aperiodic SRSs. The UE and base station may, e.g., during an RRC connection procedure, determine which antennas/antenna pairs are suitable for SRS transmissions, e.g., during a capability report exchanged during connection establishment or reconfiguration. Accordingly, the trigger message may carry or convey an indication to a particular pattern of antennas for the UE to use, e.g., the TxAS configuration.

In some aspects, if a UE is configured with a single SRS port with TxAS over 2 antennas, a single DCI can be used to trigger SRS transmission in two consecutive sounding instances. In some aspects, if the UE is configured with 2 SRS ports with TxAS over 4 antennas, a single DCI can be used to trigger SRS transmission in 2 consecutive sounding instances. The antennas selected in each sounding instance may be determined based on a predefined rule, based on a dynamic indication in the trigger message, and the like. A UE may be configured with multiple antenna selection sequences for a multiple-shot aperiodic SRS transmission. In the DCI (e.g., the trigger message), one out of the many preconfigured selection sequences may be indicated Thus, the UE may receive a trigger message at period 802 (e.g., configuration message) that carries or otherwise conveys a TxAS configuration for the UE to use for transmitting aperiodic SRSs during multiple SRS opportunities. The trigger message received at period 802 may indicate that the UE is to transmit an SRS during SRS opportunity 804 using antenna 0 and another SRS during SRS opportunity 806 using antenna 1. The pattern may be changed such that a second trigger message received at period 808 may indicate that the UE is to transmit an SRS during SRS opportunity 810 using antenna 1 and another SRS during SRS opportunity 812 using antenna 0.

In another example, the UE may receive a trigger message at period 814 that carries or otherwise conveys a TxAS configuration for the UE to use for transmitting aperiodic SRSs during multiple SRS opportunities. The trigger message received at period 814 may indicate that the UE is to transmit an SRS during SRS opportunity 816 using antennas 0 and 1 and another SRS during SRS opportunity 818 using antennas 2 and 3. The pattern may be changed such that a second trigger message received at period 820 may indicate that the UE is to transmit an SRS during SRS opportunity 822 using antennas 0 and 3 and another SRS during SRS opportunity 824 using antennas 1 and 2.

In yet another example, the UE may receive a trigger message at period 826 that carries or otherwise conveys a TxAS configuration for the UE to use for transmitting aperiodic SRSs during one or more SRS opportunities. The trigger message received at period 826 may indicate that the UE is to transmit an SRS during SRS opportunity 828 using antennas 0 and 1 and another SRS during SRS opportunity 830 using antennas 2 and 3. However, the indicated TxAS configuration may change such that a second trigger message received at period 832 only indicates that the UE is to transmit an SRS during SRS opportunity 834 using antennas 0 and 3.

Figure 9:
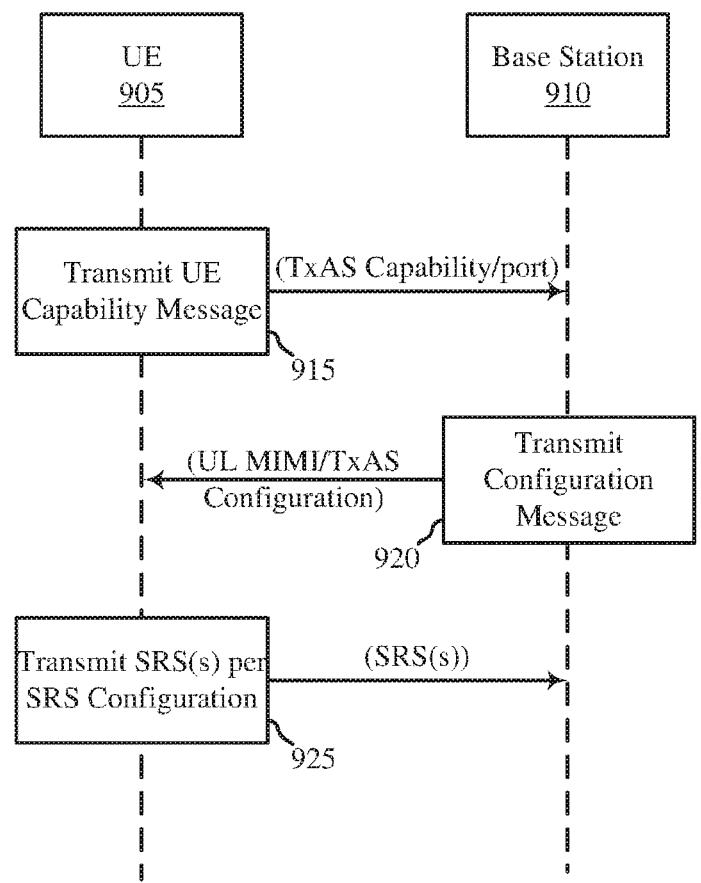
FIG. 9 illustrates an example of a process that supports method for transmitting SRS for UEs with asymmetric TX/RX in accordance with aspects of the present disclosure.

FIG. 9 illustrates an example of a process 900 that supports method for transmitting SRS for UEs with asymmetric TX/RX in accordance with various aspects of the present disclosure. In some examples, process 900 may implement aspects of wireless communication system 100 and/or UE configurations 200/300/400/500-*a*/700, timing diagram 500-*b*, SRS configurations 600-*a* and 600-*b*, and/or timing diagram 800. Process 900 may include a UE 905 and a base station 910, which may be examples of the corresponding devices described herein. Generally, process 900 illustrates one example of a UE capability procedure between the UE 905 and the base station 910.

At 915, the UE 905 may transmit a UE capability message to the base station 910. The UE capability message may indicate the TxAS capability for each port of the UE, e.g., TxAS capability on a per-port basis. The UE capability message may carry or otherwise convey and indication of the number of ports of the UE 905, the number of antennas of the UE 905, and TxAS capability for each port, and the like. The UE capability report may indicate the number of transmit/receive paths of the UE 905. The UE capability report may indicate support for UL MIMO, CA, etc., by the UE 905.

In some aspects, the UE capability message may include at a minimum the maximum number of antennas to be switched between for each SRS port. For example, the UE capability message may indicate support for up to rank-2 UL MIMO, that SRS port 0 does not support TxAS, and that SRS port 1 supports TxAS using three antennas (e.g., as illustrated in FIG. 5A).

At 920, the base station 910 may transmit a configuration message to the UE 905. The configuration message may be based, at least in some aspects, on the UE capability message. In some aspects, the configuration message may indicate an UL MIMO configuration for the UE 905. For example, the configuration message may indicate the number of spatial streams or layers for the UE 905 to use for the UL MIMO communications.

In some aspects, the configuration message may indicate TxAS configuration for the UE 905 to use. For example, the base station 910 may receive the UE capability message indicating the TxAS capability of the UE 905 and configure (e.g., in a closed-loop scenario) which antennas (and which pattern) the UE 905 will switch between for SRS transmissions. The configuration message may indicate the TxAS configuration for the UE 905 to use for each port of the UE 905. In some aspects, the configuration message may indicate the UL MIMO configuration and then indicate that the UE 905 is to use an open-loop SRS configuration. Accordingly, the UE 905 may identify (e.g., either autonomously or based on a preconfigured rule) the antennas and/or switching pattern that will be used for the SRS transmissions.

In some aspects, the configuration message may indicate the TxAS configuration per port based on the number of spatial layers for the UL MIMO. The base station 910 may select the TxAS configuration for the UE 905 to use based on the number of spatial layers. In some aspects, the base station 910 may identify the number of spatial layers used for DL MIMO communications and select the TxAS for the UE 905 to use based on the DL MIMO spatial layers.

In some aspects, the configuration message (e.g., SRS configuration message) includes at a minimum and for close-loop TxAS with UL MIMO, the number of SRS ports to be sounded and the number of antennas to be switched between for each SRS port. For example, the configuration may configure the UE 905 for UL MIMO with 2-port SRS transmission where SRS port 0 is configured without TxAS and SRS port 1 is configured with TxAS sequentially among three antennas (e.g., as illustrated in FIG. 5A).

At 925, the UE 905 may transmit SRS(s) to the base station 910. The base station 910 may receive the SRS transmissions in conjunction with the UL MIMO communications. The SRS(s) may be transmitted to the base station 910 according to the SRS configuration.

In one non-limiting example, the SRS transmission may include: sounding instance 0 using port 0/antenna 1 and port 1, antenna 1; sounding instance 1 using port 0, antenna 0 and port 1, antenna 2; sounding instance 2 using port 0, antenna 0 and port 1, antenna 3; and sounding instance 3 using port 0, antenna 0 and port 1, antenna 1.

Figure 10:
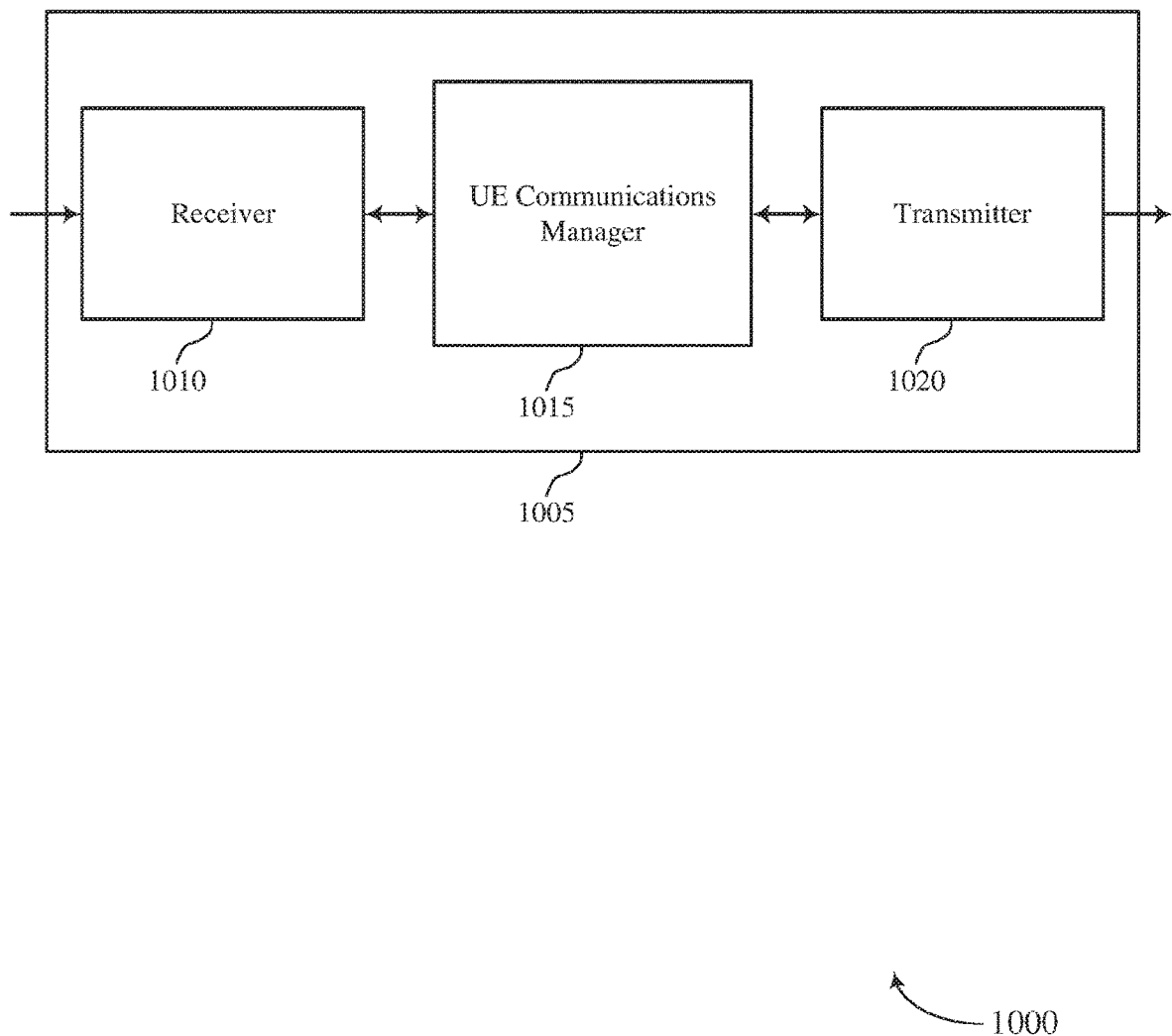
FIGS. 10 through 12 show block diagrams of a device that supports method for transmitting SRS for UEs with asymmetric TX/RX in accordance with aspects of the present disclosure.

FIG. 10 shows a block diagram 1000 of a wireless device 1005 that supports method for transmitting SRS for UEs with asymmetric TX/RX in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to method for transmitting SRS for UEs with asymmetric TX/RX, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may transmit a UE capability message to a base station, the UE capability message indicating a supported TxAS capability for each port of the UE, receive a configuration message from the base station indicating an UL MIMO configuration for the UE, the UL MIMO configuration being based on the UE capability message and including the use of two or more ports of the UE for UL MIMO communications over two or more spatial layers, identify, based on the configuration message, a SRS configuration to use for transmitting SRSs in conjunction with the UL MIMO communications, the SRS configuration including a configuration for transmission by the UE of SRSs using at least one of the two or more ports of the UE, the SRSs transmitted on one or more antennas of the UE selected according to a TxAS configuration for the respective port, and transmit the SRSs in conjunction with the UL MIMO communications and according to the SRS configuration. The UE communications manager 1015 may also transmit a UE capability message to a base station, the UE capability message indicating a supported transmit antenna switching (TxAS) capability for each port of the UE, receive a configuration message from the base station indicating an UL MIMO configuration for the UE, the UL MIMO configuration being based on the UE capability message and including the use of two or more ports of the UE for UL MIMO communications over two or more spatial layers, determine that at least one CC of two or more CCs being transmitted using a first power amplifier is configured for the UL MIMO communications in accordance with the UL MIMO configuration, identify, based on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, and transmit the SRSs in conjunction with the UL MIMO communications and according to the SRS configuration. The UE communications manager 1015 may also transmit a UE capability message to a base station, the UE capability message indicating a supported TxAS capability for each port of the UE, receive a trigger message from a base station indicating that the UE is to perform an aperiodic SRS transmission, identify, based on the trigger message, a TxAS configuration for the UE to use to transmit the aperiodic SRS transmission, and transmit the SRS transmission using one or more antennas selected based on the TxAS configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
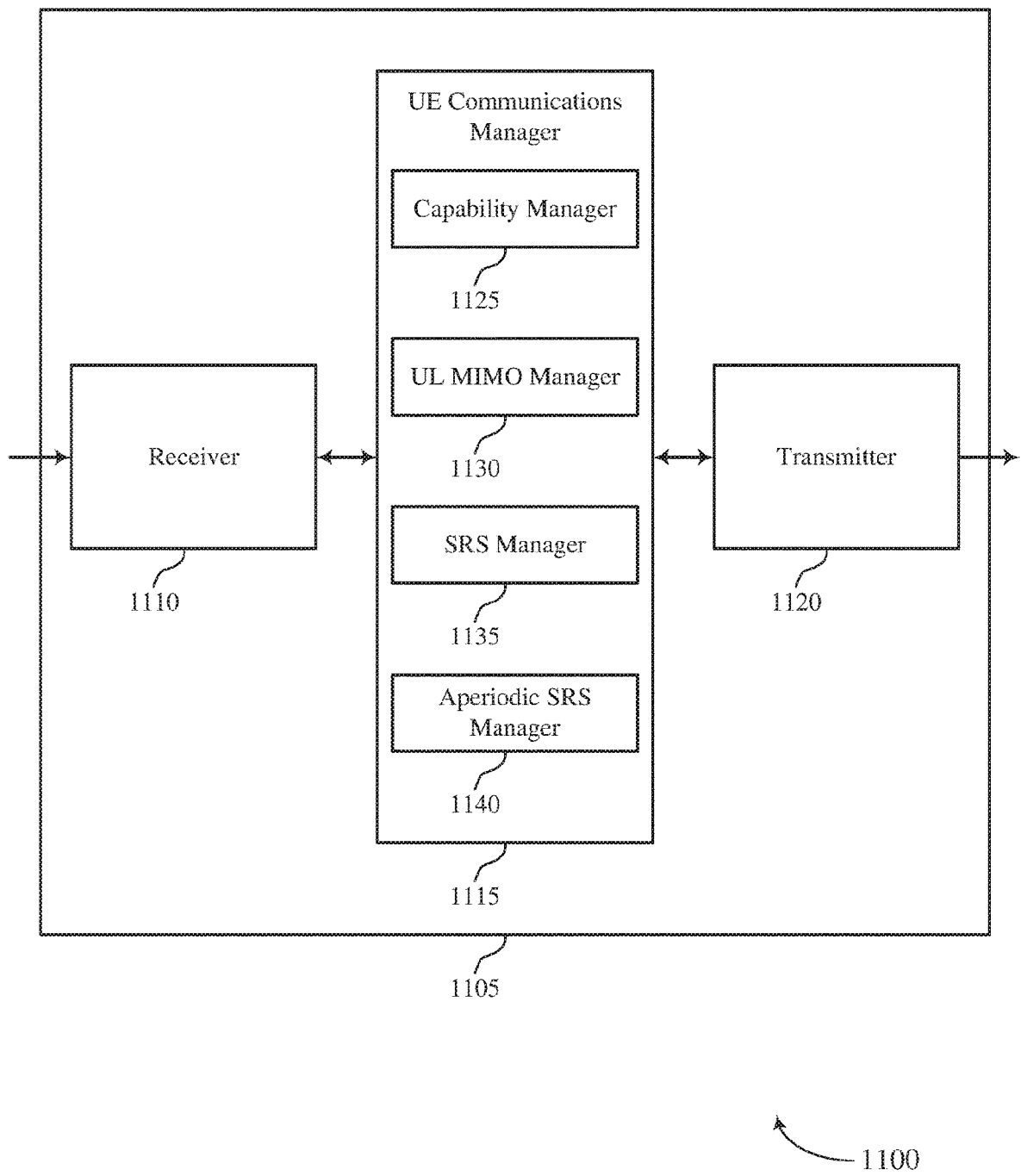

FIG. 11 shows a block diagram 1100 of a wireless device 1105 that supports method for transmitting SRS for UEs with asymmetric TX/RX in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to method for transmitting SRS for UEs with asymmetric TX/RX, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13.

UE communications manager 1115 may also include capability manager 1125, UL MIMO manager 1130, SRS manager 1135, and aperiodic SRS manager 1140.

Capability manager 1125 may transmit a UE capability message to a base station, the UE capability message indicating a supported TxAS capability for each port of the UE and transmit a UE capability message to a base station, the UE capability message indicating a supported TxAS capability for each port of the UE.

UL MIMO manager 1130 may receive a configuration message from the base station indicating an UL MIMO configuration for the UE, the UL MIMO configuration being based on the UE capability message and including the use of two or more ports of the UE for UL MIMO communications over two or more spatial layers.

SRS manager 1135 may identify, based on the configuration message, a SRS configuration to use for transmitting SRSs in conjunction with the UL MIMO communications, the SRS configuration including a configuration for transmission by the UE of SRSs using at least one of the two or more ports of the UE, the SRSs transmitted on one or more antennas of the UE selected according to a TxAS configuration for the respective port, determine that the UE has a different number of transmit paths than receive paths, where the TxAS configuration is selected based on the determining, determine that at least one CC of two or more CCs being transmitted using a first power amplifier is configured for the UL MIMO communications in accordance with the UL MIMO configuration, identify, based on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, transmit the SRSs in conjunction with the UL MIMO communications and according to the SRS configuration, transmit the SRS transmission using one or more antennas selected based on the TxAS configuration, select an TxAS configuration that includes an SRS transmission using fewer ports than antennas, select an TxAS configuration that includes an SRS transmission where different port and antenna pairs are transmitted during different SRS transmission instances, select an TxAS configuration that includes an SRS transmission using one port over two or more antennas, and identify, based on the trigger message, a TxAS configuration for the UE to use to transmit the aperiodic SRS transmission.

Aperiodic SRS manager 1140 may receive a trigger message from a base station indicating that the UE is to perform an aperiodic SRS transmission.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
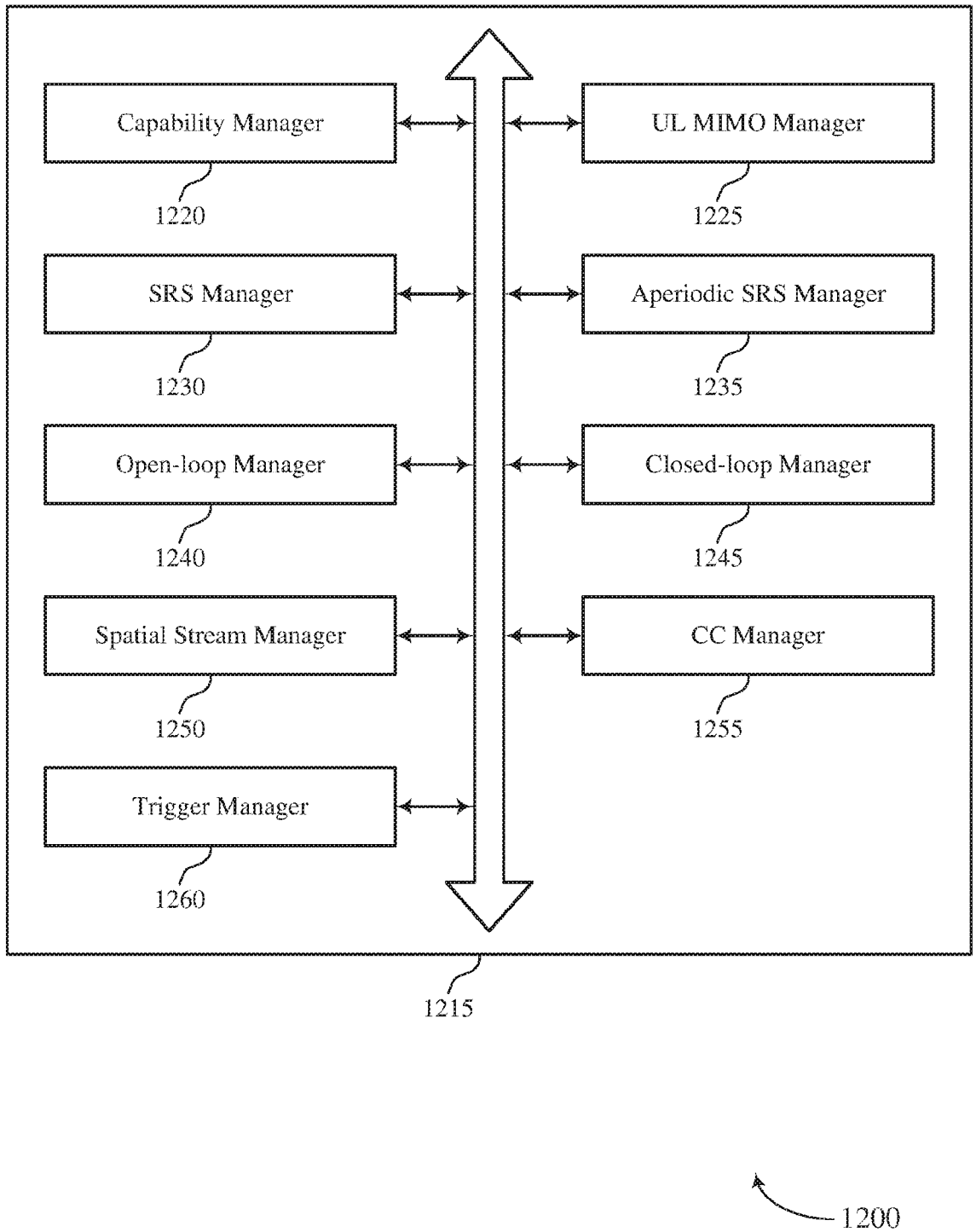

FIG. 12 shows a block diagram 1200 of a UE communications manager 1215 that supports method for transmitting SRS for UEs with asymmetric TX/RX in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include capability manager 1220, UL MIMO manager 1225, SRS manager 1230, aperiodic SRS manager 1235, open-loop manager 1240, closed-loop manager 1245, spatial stream manager 1250, CC manager 1255, and trigger manager 1260. Each of these modules may communicate, directly or indirectly, with one another (e.g., via one or more buses).

Capability manager 1220 may transmit a UE capability message to a base station, the UE capability message indicating a supported TxAS capability for each port of the UE and transmit a UE capability message to a base station, the UE capability message indicating a supported transmit antenna switching (TxAS) capability for each port of the UE.

UL MIMO manager 1225 may receive a configuration message from the base station indicating an UL MIMO configuration for the UE, the UL MIMO configuration being based on the UE capability message and including the use of two or more ports of the UE for UL MIMO communications over two or more spatial layers.

SRS manager 1230 may identify, based on the configuration message, a SRS configuration to use for transmitting SRSs in conjunction with the UL MIMO communications, the SRS configuration including a configuration for transmission by the UE of SRSs using at least one of the two or more ports of the UE, the SRSs transmitted on one or more antennas of the UE selected according to a TxAS configuration for the respective port, determine that the UE has a different number of transmit paths than receive paths, where the TxAS configuration is selected based on the determining, determine that at least one CC of two or more CCs being transmitted using a first power amplifier is configured for the UL MIMO communications in accordance with the UL MIMO configuration, identify, based on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port, transmit the SRSs in conjunction with the UL MIMO communications and according to the SRS configuration, transmit the SRS transmission using one or more antennas selected based on the TxAS configuration, select an TxAS configuration that includes an SRS transmission using fewer ports than antennas, select an TxAS configuration that includes an SRS transmission where different port and antenna pairs are transmitted during different SRS transmission instances, select an TxAS configuration that includes an SRS transmission using one port over two or more antennas, and identify, based on the trigger message, a TxAS configuration for the UE to use to transmit the aperiodic SRS transmission.

Aperiodic SRS manager 1235 may receive a trigger message from a base station indicating that the UE is to perform an aperiodic SRS transmission.

Open-loop manager 1240 may determine that the configuration message indicates that the UE is to use an open-loop TxAS configuration, where the UE autonomously selects the TxAS configuration to use for each port when transmitting the SRSs.

Closed-loop manager 1245 may determine that the configuration message indicates that the UE is to use a closed-loop TxAS configuration, where the configuration message indicates the TxAS configuration to use for each port when transmitting the SRSs. In some cases, the configuration message indicates a separate TxAS configuration for each port of the UE.

Spatial stream manager 1250 may identify a number of spatial layers in the two or more spatial layers associated with the UL MIMO communications, identify the SRS configuration based on the number of spatial layers, and determine that the UE has a different number of transmit paths than receive paths, where the SRS configuration is selected based on the determining. In some cases, the SRS configuration includes transmitting SRSs using the same number of antennas as the number of spatial layers. In some cases, the SRS configuration includes transmitting SRSs using a fewer number of antennas than the number of spatial layers.

CC manager 1255 may transmit the same SRSs on the at least one CC and on one or more additional CCs using the same SRS configuration, where the one or more additional CCs are not configured for UL MIMO communications, transmit the at least one CC using the first power amplifier and according to a first SRS configuration, transmit one or more additional CCs using a second power amplifier and according to a second SRS configuration, where the first power amplifier is different from the second power amplifier, and determine that the UE has a different number of transmit paths than receive paths, where the SRS configuration is selected based on the determining. In some cases, the at least one CC is transmitted in a first band and the one or more additional CCs are transmitted in a second band that is different from the first band. In some cases, the first SRS configuration is the same as the second SRS configuration. In some cases, the first SRS configuration is different from the second SRS configuration.

Trigger manager 1260 may decode one or more bits in the trigger message to identify the TxAS configuration, apply a reverse masking procedure to a field in the trigger message to identify the TxAS configuration, decode one or more bits in the trigger message to identify a flag associated with a set of possible TxAS configurations, where the TxAS configuration is selected based on the flag, and receive an indication of the possible TxAS configurations from the base station during a channel connection or reconfiguration procedure. In some cases, the field includes a CRC field of a PDCCH signal. In some cases, the indication of the possible TxAS configurations is received via radio resource control (RRC) signaling. In some cases, the indication of the possible TxAS configurations is received in response to the UE capability message transmitted by the UE. In some cases, the indication of the possible TxAS configurations is received in MAC CE.

Figure 13:
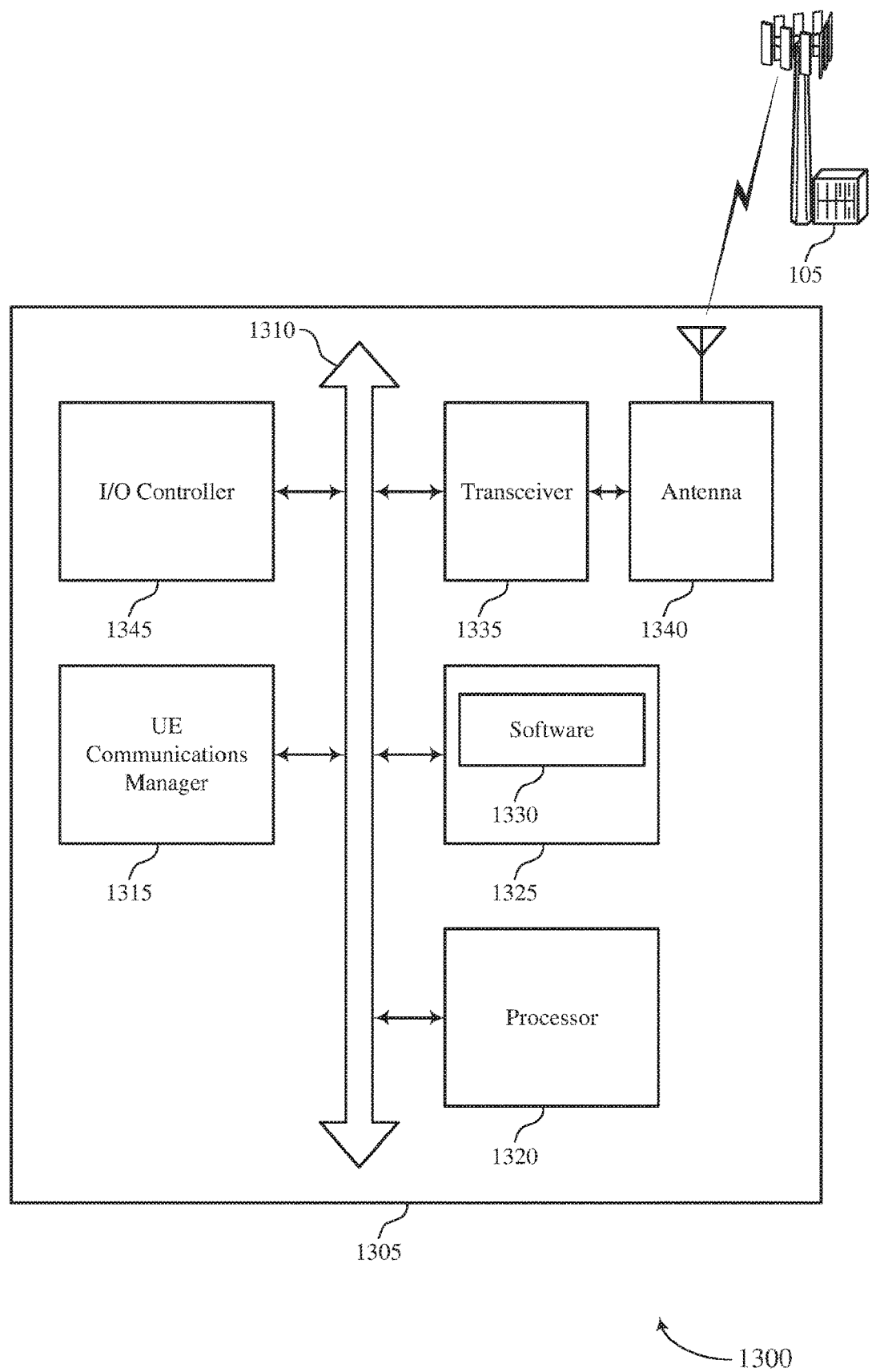
FIG. 13 illustrates a block diagram of a system including a UE that supports method for transmitting SRS for UEs with asymmetric TX/RX in accordance with aspects of the present disclosure.

FIG. 13 shows a diagram of a system 1300 including a device 1305 that supports method for transmitting SRS for UEs with asymmetric TX/RX in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting method for transmitting SRS for UEs with asymmetric TX/RX).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support method for transmitting SRS for UEs with asymmetric TX/RX. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
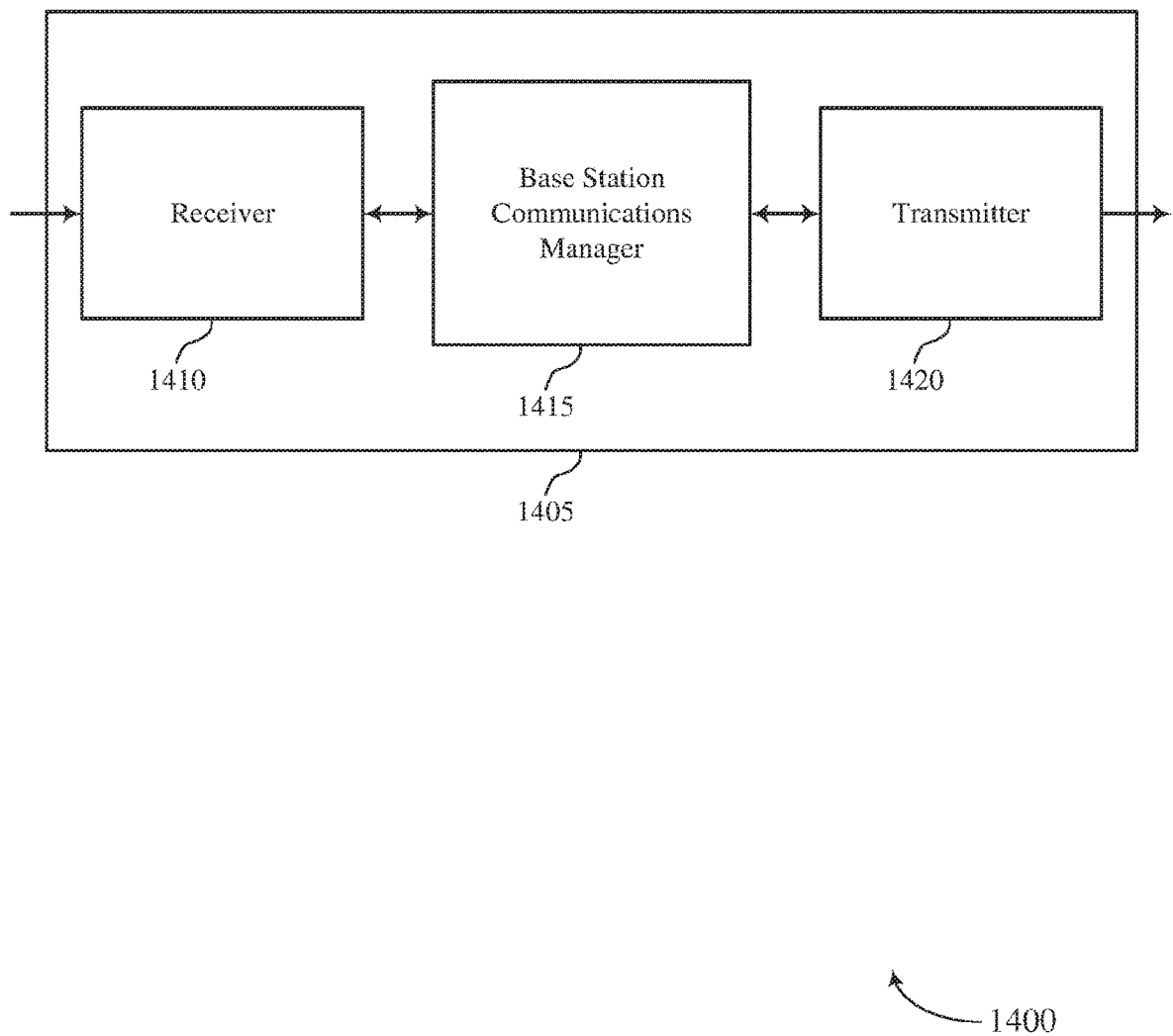
FIGS. 14 through 16 show block diagrams of a device that supports method for transmitting SRS for UEs with asymmetric TX/RX in accordance with aspects of the present disclosure.

FIG. 14 shows a block diagram 1400 of a wireless device 1405 that supports method for transmitting SRS for UEs with asymmetric TX/RX in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to method for transmitting SRS for UEs with asymmetric TX/RX, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17. Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may receive a UE capability message from a UE, the UE capability message indicating a supported TxAS capability for each port of the UE, transmit, based on the UE capability message, a configuration message to the UE indicating an UL MIMO configuration and a TxAS configuration for the UE, the configuration message indicating a TxAS configuration for the UE to use for the transmission of SRSs from each port of the UE, and receive the SRSs in conjunction with the UL MIMO communications and according to the TxAS configuration for each port.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
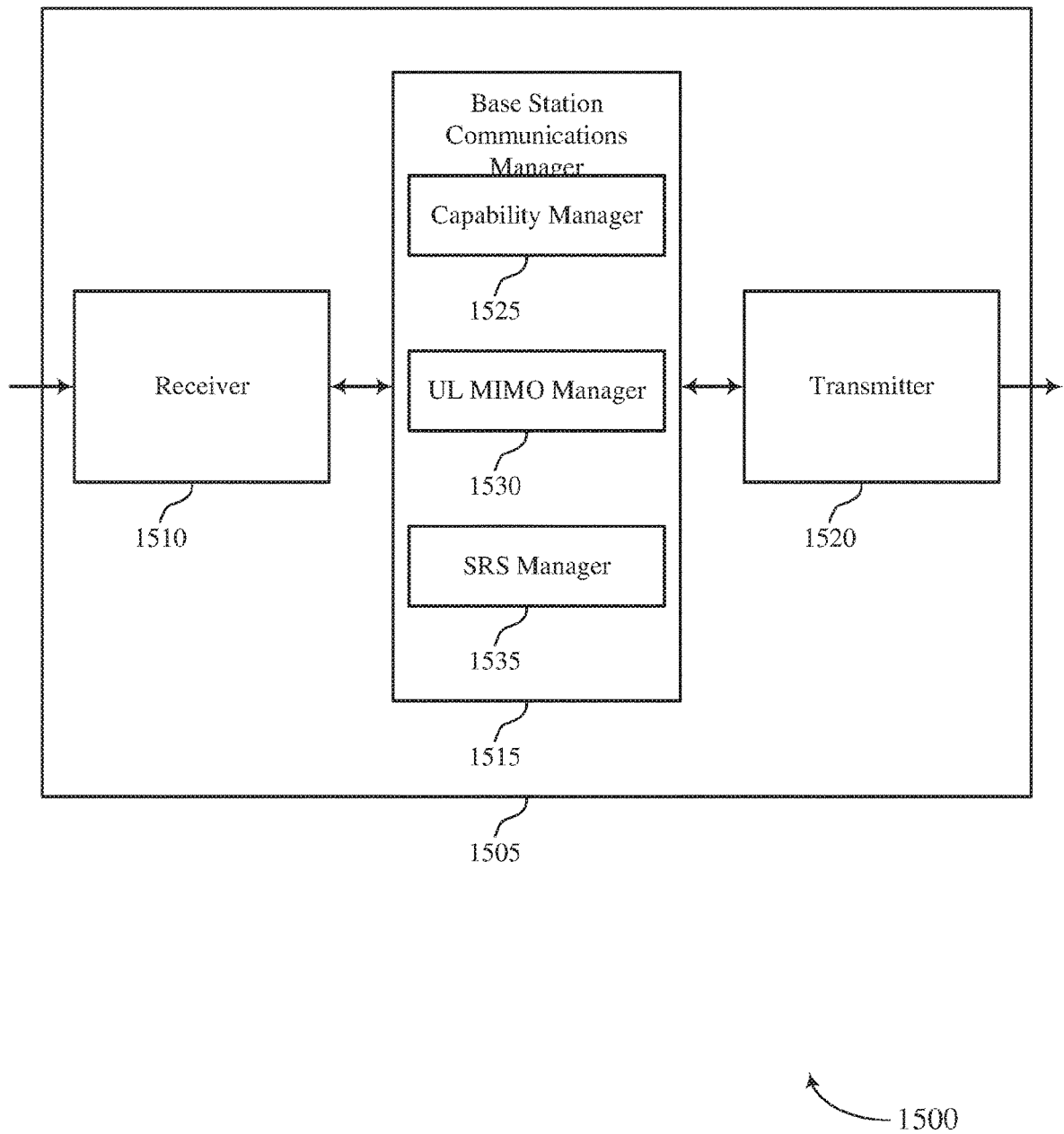

FIG. 15 shows a block diagram 1500 of a wireless device 1505 that supports method for transmitting SRS for UEs with asymmetric TX/RX in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to method for transmitting SRS for UEs with asymmetric TX/RX, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17. Base station communications manager 1515 may also include capability manager 1525, UL MIMO manager 1530, and SRS manager 1535.

Capability manager 1525 may receive a UE capability message from a UE, the UE capability message indicating a supported TxAS capability for each port of the UE.

UL MIMO manager 1530 may transmit, based on the UE capability message, a configuration message to the UE indicating an uplink multiple-input/multiple-output (UL MIMO) configuration and a TxAS configuration for the UE, the configuration message indicating a TxAS configuration for the UE to use for the transmission of sounding reference signals (SRSs) from each port of the UE.

SRS manager 1535 may receive the SRSs in conjunction with the UL MIMO communications and according to the TxAS configuration for each port.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
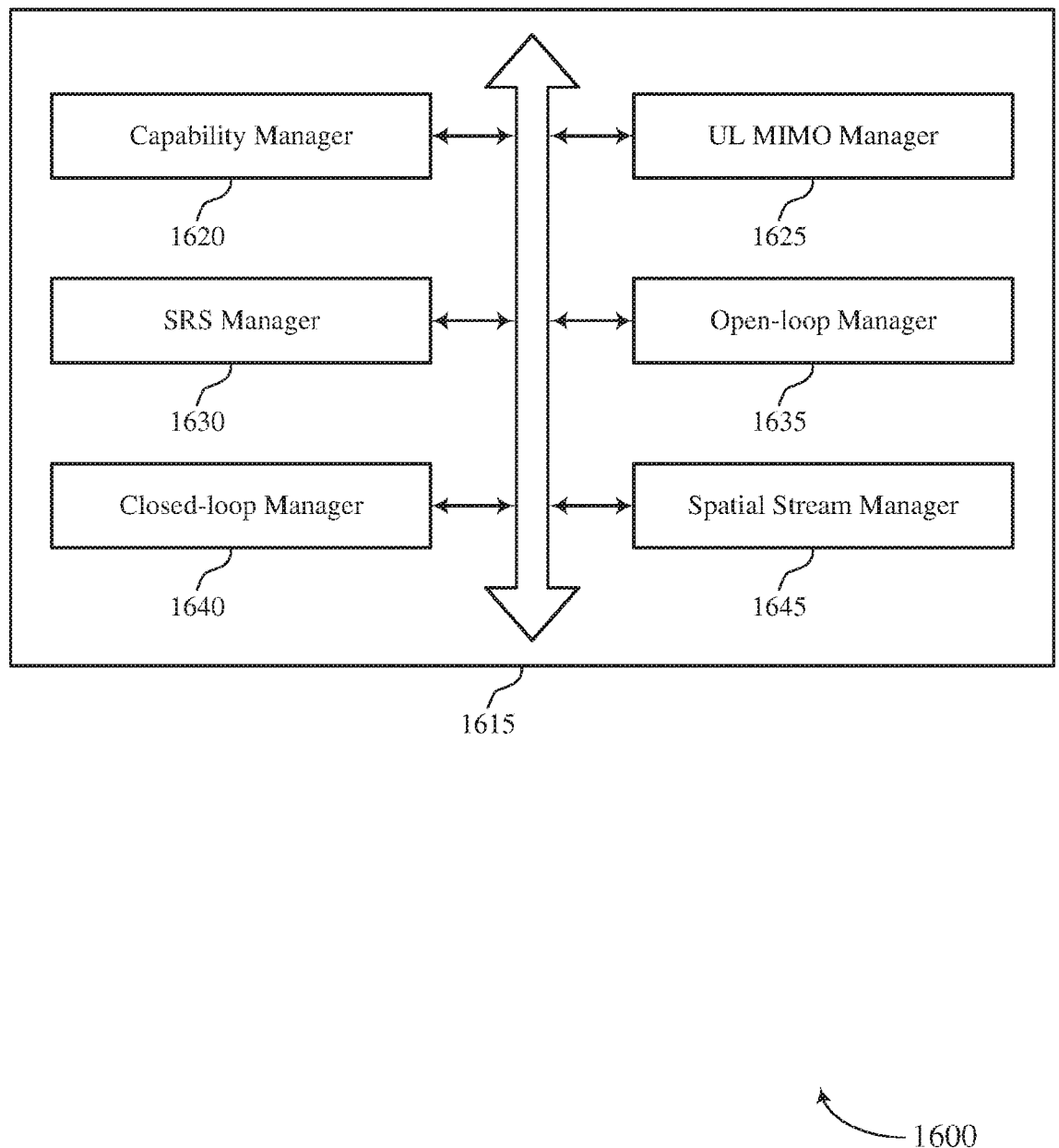

FIG. 16 shows a block diagram 1600 of a base station communications manager 1615 that supports method for transmitting SRS for UEs with asymmetric TX/RX in accordance with aspects of the present disclosure. The base station communications manager 1615 may be an example of aspects of a base station communications manager 1715 described with reference to FIGS. 14, 15, and 17. The base station communications manager 1615 may include capability manager 1620, UL MIMO manager 1625, SRS manager 1630, open-loop manager 1635, closed-loop manager 1640, and spatial stream manager 1645. Each of these modules may communicate, directly or indirectly, with one another (e.g., via one or more buses).

Capability manager 1620 may receive a UE capability message from a UE, the UE capability message indicating a supported TxAS capability for each port of the UE.

UL MIMO manager 1625 may transmit, based on the UE capability message, a configuration message to the UE indicating an UL MIMO configuration and a TxAS configuration for the UE, the configuration message indicating a TxAS configuration for the UE to use for the transmission of sounding reference signals (SRSs) from each port of the UE.

SRS manager 1630 may receive the SRSs in conjunction with the UL MIMO communications and according to the TxAS configuration for each port.

Open-loop manager 1635 may generate the configuration message to indicate that the UE is to use an open-loop TxAS configuration where the UE autonomously selects the TxAS configuration to use for each port when transmitting the SRSs.

Closed-loop manager 1640 may generate the configuration message to indicate that the UE is to use a closed-loop TxAS configuration where the configuration message indicates the TxAS configuration to use for each port when transmitting the SRSs.

Spatial stream manager 1645 may identify a number of spatial layers in two or more spatial layers associated with the UL MIMO communications, select the TxAS configuration based on the number of spatial layers, identify a number of spatial layers in two or more spatial layers associated with a downlink (DL) MIMO communications, select the TxAS configuration based on the number of spatial layers, and determine that the UE has a different number of transmit paths than receive paths, where the TxAS configuration is selected based on the determining.

Figure 17:
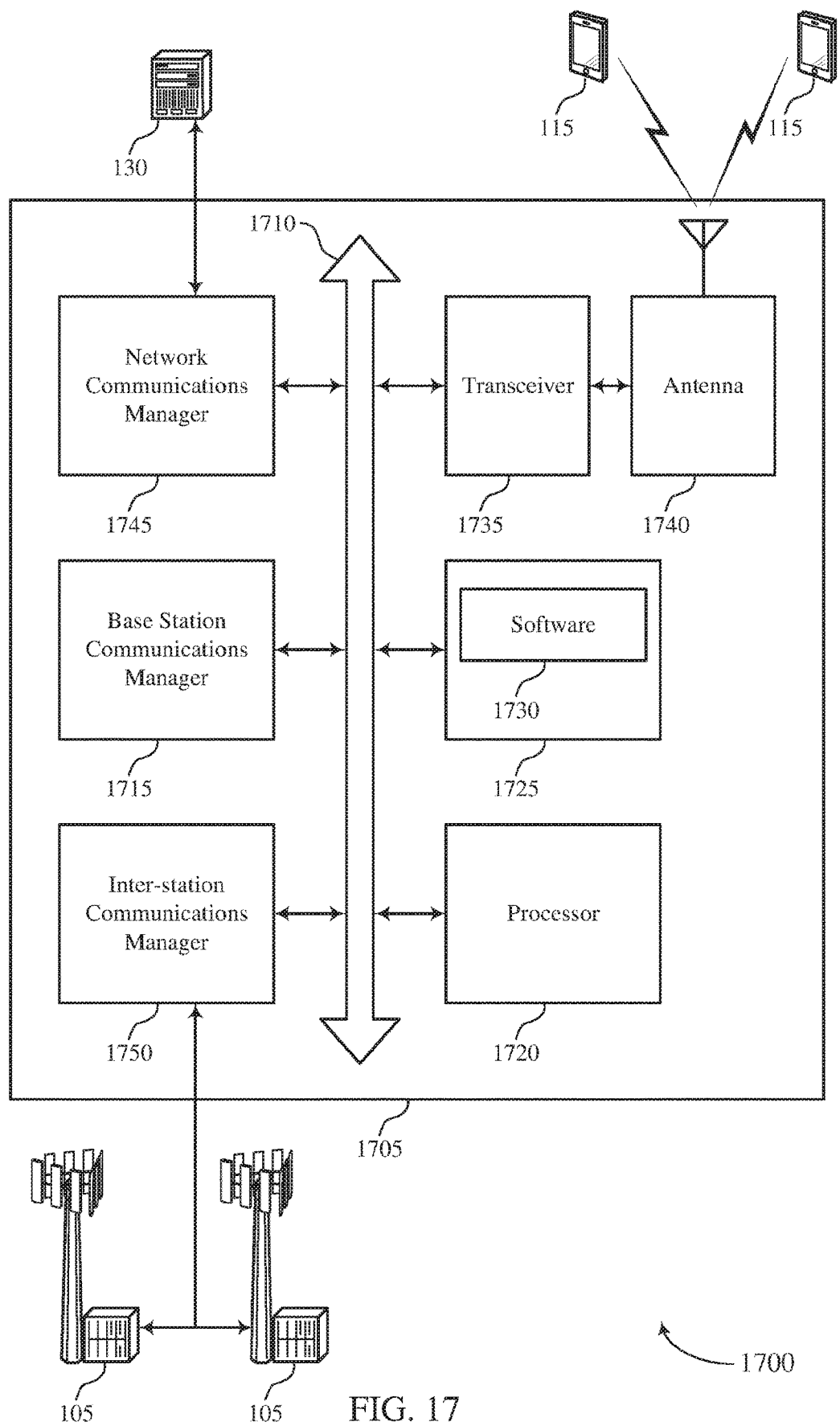
FIG. 17 illustrates a block diagram of a system including a base station that supports method for transmitting SRS for UEs with asymmetric TX/RX in accordance with aspects of the present disclosure.

FIG. 17 shows a diagram of a system 1700 including a device 1705 that supports method for transmitting SRS for UEs with asymmetric TX/RX in accordance with aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting method for transmitting SRS for UEs with asymmetric TX/RX).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support method for transmitting SRS for UEs with asymmetric TX/RX. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an Long Term Evolution (LTE)/LTE-A wireless communication network technology to provide communication between base stations 105.

Figure 18:
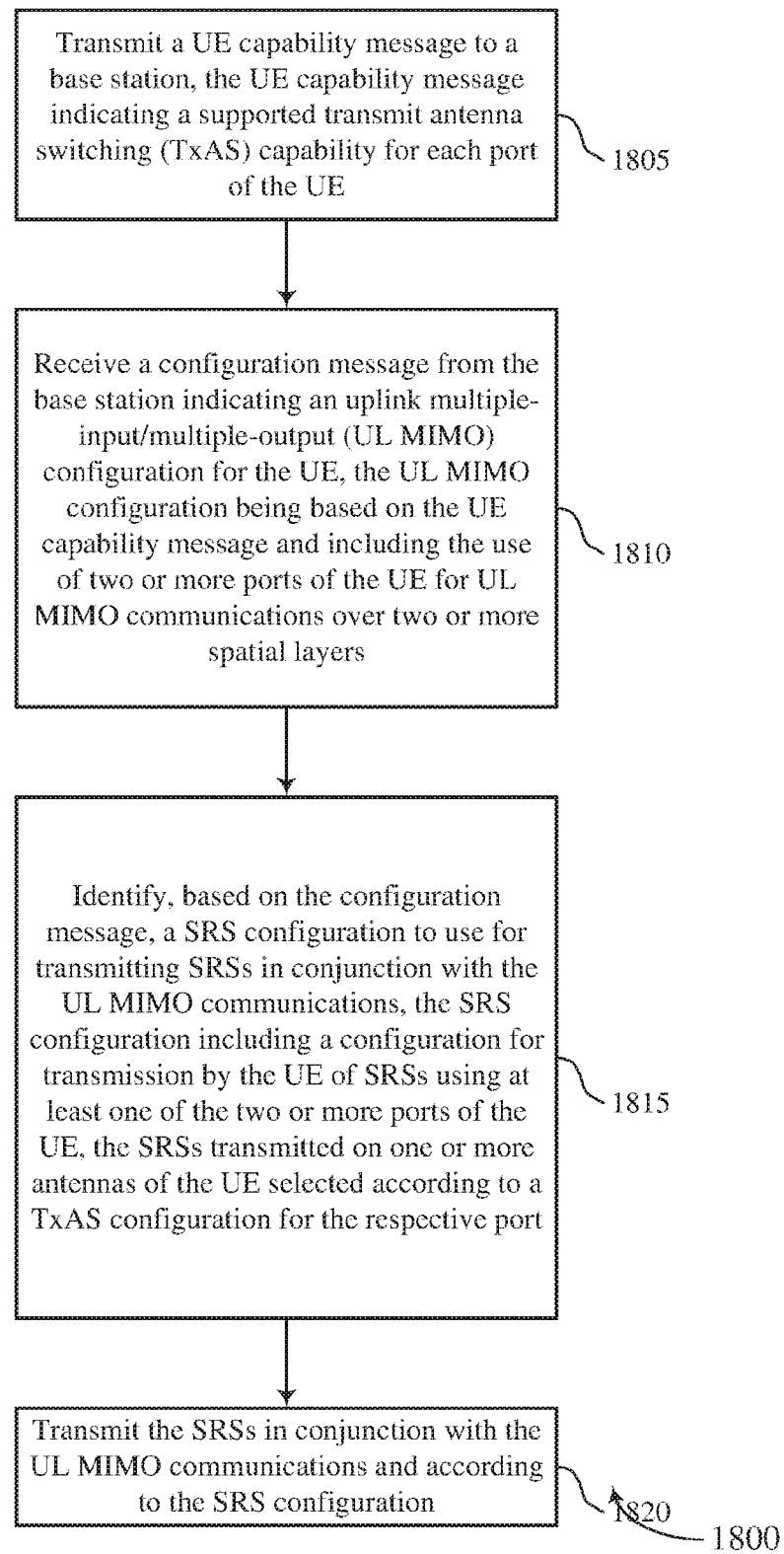
FIGS. 18 through 21 illustrate methods for method for transmitting SRS for UEs with asymmetric TX/RX in accordance with aspects of the present disclosure.

FIG. 18 shows a flowchart illustrating a method 1800 for method for transmitting SRS for UEs with asymmetric TX/RX in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may transmit a UE capability message to a base station, the UE capability message indicating a supported TxAS capability for each port of the UE.

The operations of block 1805 may be performed according to the methods described herein. In certain examples, aspects of the operations of block 1805 may be performed by a capability manager as described with reference to FIGS. 10 through 13.

At block 1810 the UE 115 may receive a configuration message from the base station indicating an UL MIMO configuration for the UE, the UL MIMO configuration being based at least in part on the UE capability message and comprising the use of two or more ports of the UE for UL MIMO communications over two or more spatial layers. The operations of block 1810 may be performed according to the methods described herein. In certain examples, aspects of the operations of block 1810 may be performed by a UL MIMO manager as described with reference to FIGS. 10 through 13.

At block 1815 the UE 115 may identify, based at least in part on the configuration message, a SRS configuration to use for transmitting SRSs in conjunction with the UL MIMO communications, the SRS configuration comprising a configuration for transmission by the UE of SRSs using at least one of the two or more ports of the UE, the SRSs transmitted on one or more antennas of the UE selected according to a TxAS configuration for the respective port. The operations of block 1815 may be performed according to the methods described herein. In certain examples, aspects of the operations of block 1815 may be performed by a SRS manager as described with reference to FIGS. 10 through 13.

At block 1820 the UE 115 may transmit the SRSs in conjunction with the UL MIMO communications and according to the SRS configuration. The operations of block 1820 may be performed according to the methods described herein. In certain examples, aspects of the operations of block 1820 may be performed by a SRS manager as described with reference to FIGS. 10 through 13.

Figure 19:
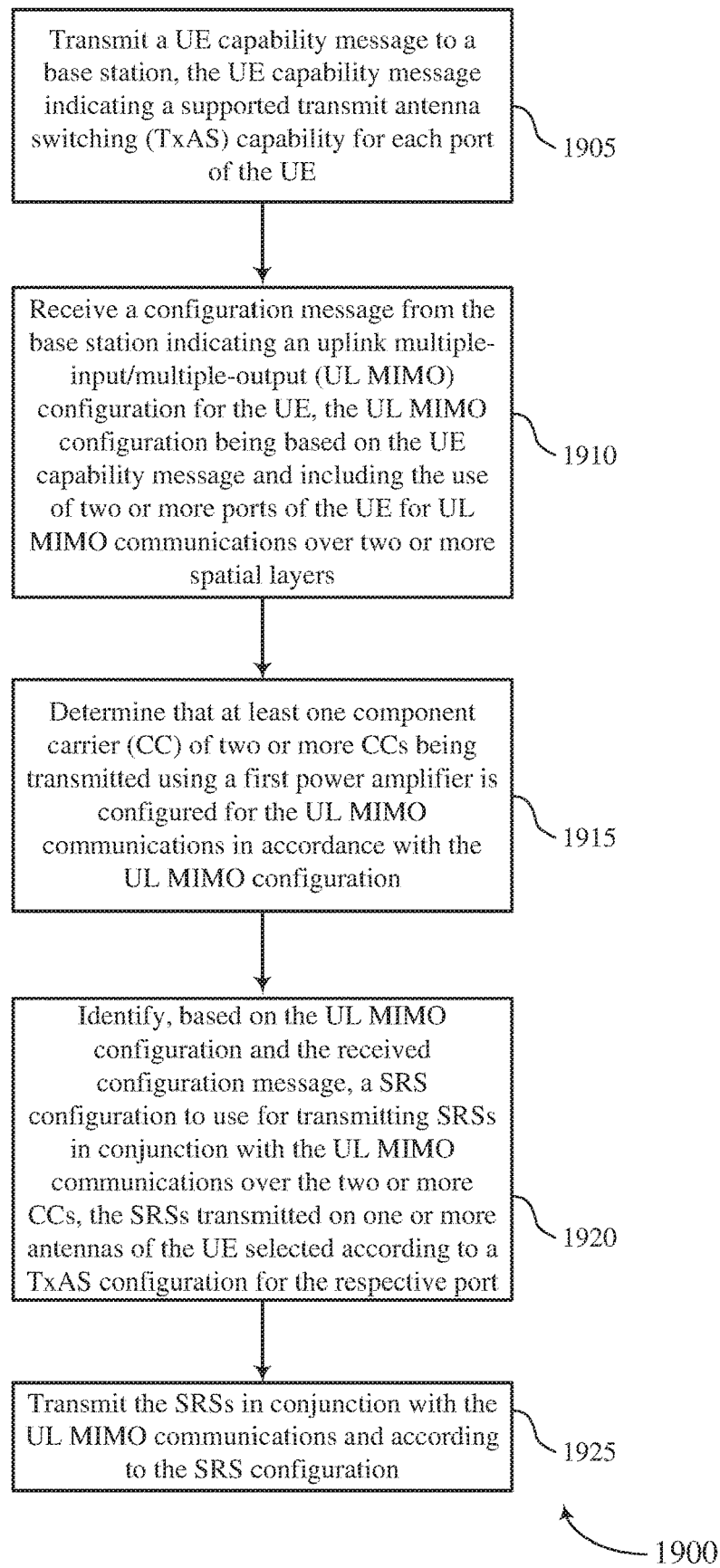

FIG. 19 shows a flowchart illustrating a method 1900 for method for transmitting SRS for UEs with asymmetric TX/RX in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may transmit a UE capability message to a base station, the UE capability message indicating a supported TxAS capability for each port of the UE. The operations of block 1905 may be performed according to the methods described herein. In certain examples, aspects of the operations of block 1905 may be performed by a capability manager as described with reference to FIGS. 10 through 13.

At block 1910 the UE 115 may receive a configuration message from the base station indicating an UL MIMO configuration for the UE, the UL MIMO configuration being based at least in part on the UE capability message and comprising the use of two or more ports of the UE for UL MIMO communications over two or more spatial layers. The operations of block 1910 may be performed according to the methods described herein. In certain examples, aspects of the operations of block 1910 may be performed by a UL MIMO manager as described with reference to FIGS. 10 through 13.

At block 1915 the UE 115 may determine that at least one CC of two or more CCs being transmitted using a first power amplifier is configured for the UL MIMO communications in accordance with the UL MIMO configuration. The operations of block 1915 may be performed according to the methods described herein. In certain examples, aspects of the operations of block 1915 may be performed by a SRS manager as described with reference to FIGS. 10 through 13.

At block 1920 the UE 115 may identify, based at least in part on the UL MIMO configuration and the received configuration message, a SRS configuration to use for transmitting SRSs in conjunction with the UL MIMO communications over the two or more CCs, the SRSs transmitted on one or more antennas of the UE selected according to a TxAS configuration for the respective port. The operations of block 1920 may be performed according to the methods described herein. In certain examples, aspects of the operations of block 1920 may be performed by a SRS manager as described with reference to FIGS. 10 through 13.

At block 1925 the UE 115 may transmit the SRSs in conjunction with the UL MIMO communications and according to the SRS configuration. The operations of block 1925 may be performed according to the methods described herein. In certain examples, aspects of the operations of block 1925 may be performed by a SRS manager as described with reference to FIGS. 10 through 13.

Figure 20:
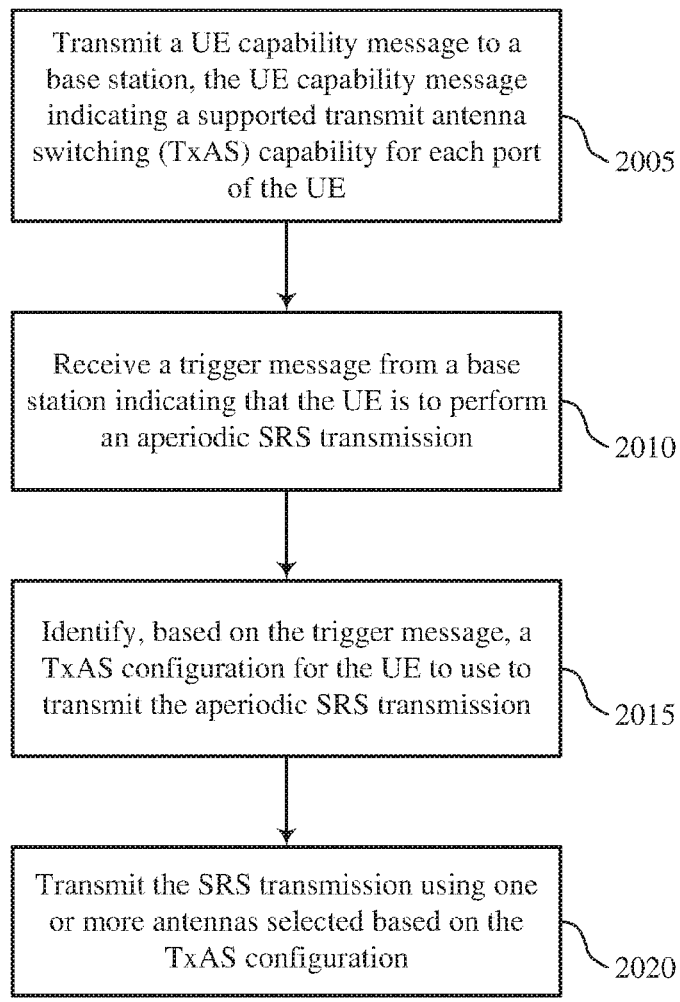

FIG. 20 shows a flowchart illustrating a method 2000 for method for transmitting SRS for UEs with asymmetric TX/RX in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may transmit a UE capability message to a base station, the UE capability message indicating a supported TxAS capability for each port of the UE. The operations of block 2005 may be performed according to the methods described herein. In certain examples, aspects of the operations of block 2005 may be performed by a capability manager as described with reference to FIGS. 10 through 13.

At block 2010 the UE 115 may receive a trigger message from a base station indicating that the UE is to perform an aperiodic sounding reference signal (SRS) transmission. The operations of block 2010 may be performed according to the methods described herein. In certain examples, aspects of the operations of block 2010 may be performed by a aperiodic SRS manager as described with reference to FIGS. 10 through 13.

At block 2015 the UE 115 may identify, based at least in part on the trigger message, a TxAS configuration for the UE to use to transmit the aperiodic SRS transmission. The operations of block 2015 may be performed according to the methods described herein. In certain examples, aspects of the operations of block 2015 may be performed by a SRS manager as described with reference to FIGS. 10 through 13.

At block 2020 the UE 115 may transmit the SRS transmission using one or more antennas selected based at least in part on the TxAS configuration. The operations of block 2020 may be performed according to the methods described herein. In certain examples, aspects of the operations of block 2020 may be performed by a SRS manager as described with reference to FIGS. 10 through 13.

Figure 21:
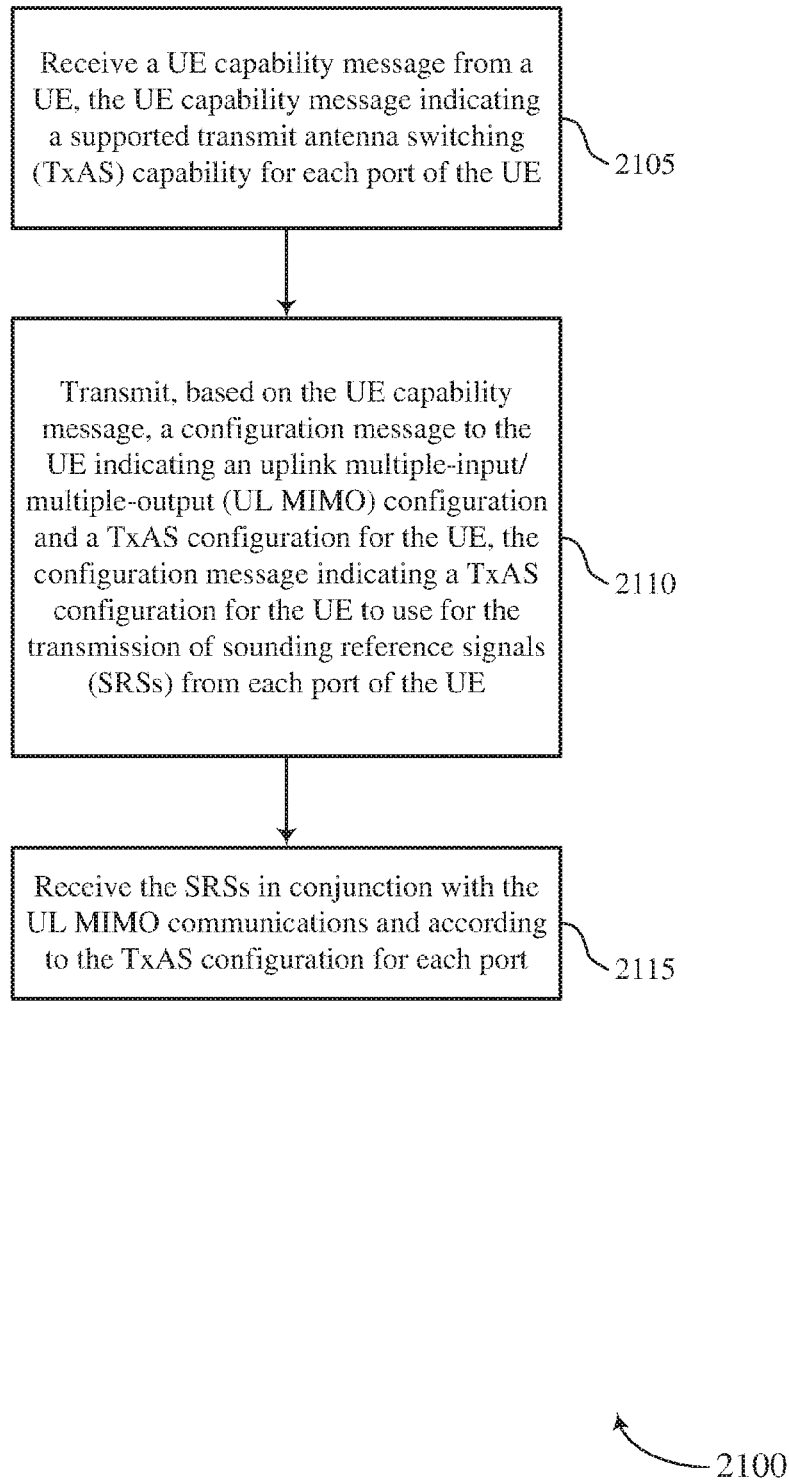

FIG. 21 shows a flowchart illustrating a method 2100 for method for transmitting SRS for UEs with asymmetric TX/RX in accordance with aspects of the present disclosure. The operations of method 2100 may be implemented by a base station 105 or its components as described herein. For example, the operations of method 2100 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may receive a UE capability message from a UE, the UE capability message indicating a supported TxAS capability for each port of the UE. The operations of block 2105 may be performed according to the methods described herein. In certain examples, aspects of the operations of block 2105 may be performed by a capability manager as described with reference to FIGS. 14 through 17.

At block 2110 the base station 105 may transmit, based at least in part on the UE capability message, a configuration message to the UE indicating an UL MIMO configuration and a TxAS configuration for the UE, the configuration message indicating a TxAS configuration for the UE to use for the transmission of SRSs from each port of the UE. The operations of block 2110 may be performed according to the methods described herein. In certain examples, aspects of the operations of block 2110 may be performed by a UL MIMO manager as described with reference to FIGS. 14 through 17.

At block 2115 the base station 105 may receive the SRSs in conjunction with the UL MIMO communications and according to the TxAS configuration for each port. The operations of block 2115 may be performed according to the methods described herein. In certain examples, aspects of the operations of block 2115 may be performed by a SRS manager as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting a UE capability message to a network device using one or more antennas of the UE, the UE capability message indicating a supported transmit antenna switching (TxAS) capability for a plurality of ports of the UE, wherein each port of the plurality of ports of the UE comprises a transmit path performing transmissions using some or all of the one or more antennas of the UE;
    receiving a configuration message from the network device indicating an uplink multiple-input/multiple-output (UL MIMO) configuration for the UE, the UL MIMO configuration being based at least in part on the UE capability message and comprising the use of two or more ports of the UE for UL MIMO communications over two or more spatial layers;
    identifying, based at least in part on the configuration message, a sounding reference signal (SRS) configuration to use for transmitting SRSs in conjunction with the UL MIMO communications, the SRS configuration comprising a configuration for transmission by the UE of SRSs using at least one of the two or more ports of the UE, the SRSs transmitted on the one or more antennas of the UE selected according to a TxAS configuration for the respective port; and
    transmitting the SRSs in conjunction with the UL MIMO communications and according to the SRS configuration.

2. The method of claim 1, further comprising:
    determining that the configuration message indicates that the UE is to use an open-loop TxAS configuration, wherein the UE autonomously selects the TxAS configuration to use for each port when transmitting the SRSs.

3. The method of claim 1, further comprising:
    determining that the configuration message indicates that the UE is to use a closed-loop TxAS configuration, wherein the configuration message indicates the TxAS configuration to use for each port when transmitting the SRSs.

4. The method of claim 3, wherein:
the configuration message indicates a separate TxAS configuration for each port of the UE.

5. The method of claim 1, further comprising:
identifying a number of spatial layers in the two or more spatial layers associated with the UL MIMO communications; and
selecting the SRS configuration based at least in part on the number of spatial layers.

6. The method of claim 5, wherein:
the SRS configuration comprises transmitting SRSs using a same number of antennas as the number of spatial layers.

7. The method of claim 5, wherein:
the SRS configuration comprises transmitting SRSs using a fewer number of antennas than the number of spatial layers.

8. The method of claim 1, further comprising:
determining that the UE has a different number of transmit paths than receive paths, wherein the SRS configuration is selected based at least in part on the determining.

9. A method for wireless communication at a user equipment (UE), comprising:
transmitting a UE capability message to a network device using one or more antennas of the UE, the UE capability message indicating a supported transmit antenna switching (TxAS) capability for each port of the UE, wherein each port of the UE comprises a transmit path performing transmissions using some or all of the one or more antennas of the UE;
receiving a configuration message from the network device indicating an uplink multiple-input/multiple-output (UL MIMO) configuration for the UE, the UL MIMO configuration being based at least in part on the UE capability message and comprising the use of two or more ports of the UE for UL MIMO communications over two or more spatial layers;
determining that at least one component carrier (CC) of two or more CCs being transmitted using a first power amplifier is configured for the UL MIMO communications in accordance with the UL MIMO configuration;
identifying, based at least in part on the UL MIMO configuration and the received configuration message, a sounding reference signal (SRS) configuration to use for transmitting SRSs in conjunction with the UL MIMO communications over the two or more CCs, the SRSs transmitted on the one or more antennas of the UE selected according to a TxAS configuration for the respective port; and
transmitting the SRSs in conjunction with the UL MIMO communications and according to the SRS configuration.

10. The method of claim 9, further comprising:
transmitting a same SRS on the at least one CC and on one or more additional CCs using a same SRS configuration, wherein the one or more additional CCs are not configured for UL MIMO communications.

11. The method of claim 9, further comprising:
transmitting the at least one CC using the first power amplifier and according to a first SRS configuration; and
transmitting one or more additional CCs using a second power amplifier and according to a second SRS configuration, wherein the first power amplifier is different from the second power amplifier.

12. The method of claim 11, wherein:
the at least one CC is transmitted in a first band and the one or more additional CCs are transmitted in a second band that is different from the first band.

13. The method of claim 11, wherein:
the first SRS configuration is a same SRS configuration as the second SRS configuration.

14. The method of claim 11, wherein:
the first SRS configuration is different from the second SRS configuration.

15. The method of claim 11, further comprising:
determining that the UE has a different number of transmit paths than receive paths, wherein the SRS configuration is selected based at least in part on the determining.

16. A method for wireless communication at a user equipment (UE), comprising:
transmitting a UE capability message to a network device using one or more antennas of the UE, the UE capability message indicating a supported transmit antenna switching (TxAS) capability for a plurality of ports of the UE, wherein each port of the plurality of ports of the UE comprises a transmit path performing transmissions using some or all of the one or more antennas of the UE;
receiving a trigger message from network device indicating that the UE is to perform an aperiodic sounding reference signal (SRS) transmission;
identifying, based at least in part on the trigger message, a TxAS configuration for the UE to use to transmit the aperiodic SRS transmission; and
transmitting the SRS transmission using the one or more antennas selected based at least in part on the TxAS configuration.

17. The method of claim 16, further comprising:
decoding one or more bits in the trigger message to identify the TxAS configuration.

18. The method of claim 16, further comprising:
applying a reverse masking procedure to a field in the trigger message to identify the TxAS configuration.

19. The method of claim 18, wherein:
the field comprises a cyclic redundancy check (CRC) field of a physical downlink control channel (PDCCH) signal.

20. The method of claim 16, further comprising:
decoding one or more bits in the trigger message to identify the TxAS configuration from a plurality of possible TxAS configurations.

21. The method of claim 20, further comprising:
receiving an indication of the plurality of possible TxAS configurations from the network device during a channel connection or reconfiguration procedure.

22. The method of claim 20, wherein:
an indication of the plurality of possible TxAS configurations is received via radio resource control (RRC) signaling.

23. The method of claim 20, wherein:
an indication of the plurality of possible TxAS configurations is received in response to the UE capability message transmitted by the UE.

24. The method of claim 20, wherein:
the indication of the possible TxAS configurations is received in a media access control (MAC) control element (CE).

25. The method of claim 16, further comprising:
selecting an TxAS configuration that comprises an SRS transmission using fewer ports than antennas.

26. The method of claim 16, further comprising:
selecting the TxAS configuration that comprises an SRS transmission where different port and antenna pairs are transmitted during different SRS transmission instances.

27. The method of claim 16, further comprising:
performing, based at least in part on the TxAS configuration, the SRS transmission using one port over two or more antennas.

28. The method of claim 16, further comprising:
determining that the UE has a different number of transmit paths than receive paths, wherein the TxAS configuration is selected based at least in part on the determining.

29. A method for wireless communication at a network device, comprising:
receiving a user equipment (UE) capability message from a UE using one or more antennas of the UE, the UE capability message indicating a supported transmit antenna switching (TxAS) capability for each port of the UE, wherein each port of the UE comprises a transmit path performing transmissions using some or all of the one or more antennas of the UE;
transmitting, based at least in part on the UE capability message, a configuration message to the UE indicating an uplink multiple-input/multiple-output (UL MIMO) configuration and a TxAS configuration for the UE, the configuration message indicating a TxAS configuration for the UE to use for transmission of sounding reference signals (SRSs) from each port of the UE; and
receiving the SRSs in conjunction with the UL MIMO communications and according to the TxAS configuration for each port.

30. The method of claim 29, further comprising:
generating the configuration message to indicate that the UE is to use an open-loop TxAS configuration where the UE autonomously selects the TxAS configuration to use for each port when transmitting the SRSs.

31. The method of claim 29, further comprising:
generating the configuration message to indicate that the UE is to use a closed-loop TxAS configuration where the configuration message indicates the TxAS configuration to use for each port when transmitting the SRSs.

32. The method of claim 29, further comprising:
identifying a number of spatial layers in two or more spatial layers associated with the UL MIMO communications; and
selecting the TxAS configuration based at least in part on the number of spatial layers.

33. The method of claim 29, further comprising:
identifying a number of spatial layers in two or more spatial layers associated with a downlink (DL) MIMO communications; and
selecting the TxAS configuration based at least in part on the number of spatial layers.

34. The method of claim 29, further comprising:
determining that the UE has a different number of transmit paths than receive paths, wherein the TxAS configuration is selected based at least in part on the determining.

* * * * *